United States Patent [19]
Smith et al.

[11] Patent Number: 6,059,452
[45] Date of Patent: May 9, 2000

[54] QUICK REGISTERING THERMOMETER

[75] Inventors: Richard P. Smith, Decatur, Ill.; Ned M. Cole, Jr., Lucie, Fla.; Roger B. Whitaker, Springfield; Dale R. Andrews, Decatur, both of Ill.

[73] Assignee: RTD Technology, Inc., Decatur, Ill.

[21] Appl. No.: 09/036,891

[22] Filed: Mar. 9, 1998

Related U.S. Application Data

[62] Division of application No. 08/363,688, Dec. 23, 1994, Pat. No. 5,725,308.

[51] Int. Cl.$^7$ ........................................................ G01J 5/24
[52] U.S. Cl. ........................... 374/169; 374/121; 374/183; 600/549; 702/133
[58] Field of Search ..................................... 374/120, 121, 374/169, 183, 185, 208; 600/549; 702/131, 133

[56] References Cited

U.S. PATENT DOCUMENTS

| | | |
|---|---|---|
| 3,781,837 | 12/1973 | Anderson et al. . |
| 3,822,598 | 7/1974 | Brothers et al. . |
| 3,942,123 | 3/1976 | Georgi . |
| 4,023,094 | 5/1977 | Adams . |
| 4,133,208 | 1/1979 | Parlanti . |
| 4,161,880 | 7/1979 | Prosky . |
| 4,191,197 | 3/1980 | Benzinger . |
| 4,198,676 | 4/1980 | Varnum et al. . |
| 4,199,986 | 4/1980 | Gansimeier et al. . |
| 4,210,024 | 7/1980 | Ishiwatari et al. . |
| 4,411,535 | 10/1983 | Schwarzschild ........................ 374/165 |
| 4,432,232 | 2/1984 | Brantley et al. ............................. 374/1 |
| 4,503,862 | 3/1985 | Baessler ................................. 600/549 |
| 4,509,531 | 4/1985 | Ward . |
| 4,536,851 | 8/1985 | Germanton et al. . |
| 4,551,031 | 11/1985 | Ishikawa et al. . |
| 4,572,213 | 2/1986 | Kawahara . |
| 4,575,806 | 3/1986 | Aldrich et al. . |
| 4,592,000 | 5/1986 | Ishizaka et al. . |
| 4,634,294 | 1/1987 | Christol et al. . |
| 4,691,713 | 9/1987 | Suzuki ..................................... 374/104 |
| 4,789,343 | 12/1988 | Doherty et al. . |
| 4,790,324 | 12/1988 | O'Hara et al. . |
| 4,797,840 | 1/1989 | Fraden . |
| 4,813,790 | 3/1989 | Frankel et al. . |
| 4,832,599 | 5/1989 | Kung . |
| 4,838,707 | 6/1989 | Ozawa et al. . |
| 4,843,577 | 6/1989 | Muramoto . |
| 4,854,730 | 8/1989 | Fraden . |
| 4,866,621 | 9/1989 | Ono . |
| 4,878,184 | 10/1989 | Okada et al. . |
| 4,885,573 | 12/1989 | Fry et al. . |
| 4,895,164 | 1/1990 | Wood . |
| 4,900,162 | 2/1990 | Beckman et al. . |
| 4,930,222 | 6/1990 | Nakanishi et al. . |
| 4,955,980 | 9/1990 | Masuo . |
| 4,962,765 | 10/1990 | Kung et al. . |
| 4,986,669 | 1/1991 | Yamaguchi . |
| 4,993,424 | 2/1991 | Suszynski et al. . |
| 5,011,294 | 4/1991 | Yamaguchi . |
| 5,012,813 | 5/1991 | Pompei et al. . |
| 5,018,875 | 5/1991 | Cook . |
| 5,044,767 | 9/1991 | Gustafsson . |
| 5,056,048 | 10/1991 | Seperant . |
| 5,062,432 | 11/1991 | James et al. . |

(List continued on next page.)

*Primary Examiner*—Andrew H. Hirshfeld
*Attorney, Agent, or Firm*—Jones, Day, Reavis & Pogue

[57] ABSTRACT

A quick registering thermometer utilizing a sensor that has electrical resistance varying with temperature located at the tip of a probe, the sensor having relatively small thermal mass and short thermal time constant. Within seconds of contact with the patient, the circuitry communicating with the sensor determines the rate of change in resistance of the sensor and, in turn, the temperature that the sensor would reach if allowed the length of time it would need to reach equilibrium with the contact surface of the patient. Based on the equilibrium temperature determined for the surface of the patient, the circuitry calculates and registers the core body temperature.

17 Claims, 20 Drawing Sheets

U.S. PATENT DOCUMENTS

| | | |
|---|---|---|
| 5,078,137 | 1/1992 | Edell et al. . |
| 5,098,200 | 3/1992 | O'Brien et al. ......................... 374/163 |
| 5,159,936 | 11/1992 | Yelderman et al. . |
| 5,164,991 | 11/1992 | Johnson et al. ......................... 381/120 |
| 5,165,798 | 11/1992 | Watanabe . |
| 5,167,235 | 12/1992 | Seacord et al. . |
| 5,169,234 | 12/1992 | Bohm . |
| 5,178,464 | 1/1993 | Fraden . |
| 5,178,468 | 1/1993 | Shiokawa et al. . |
| 5,199,436 | 4/1993 | Pompei et al. . |
| 5,211,479 | 5/1993 | Coffey et al. . |
| 5,293,877 | 3/1994 | O'Hara et al. . |
| 5,325,863 | 7/1994 | Pompei . |
| 5,360,266 | 11/1994 | Lenfers et al. ......................... 374/164 |
| 5,388,455 | 2/1995 | Hamby et al. ....................... 73/152.29 |

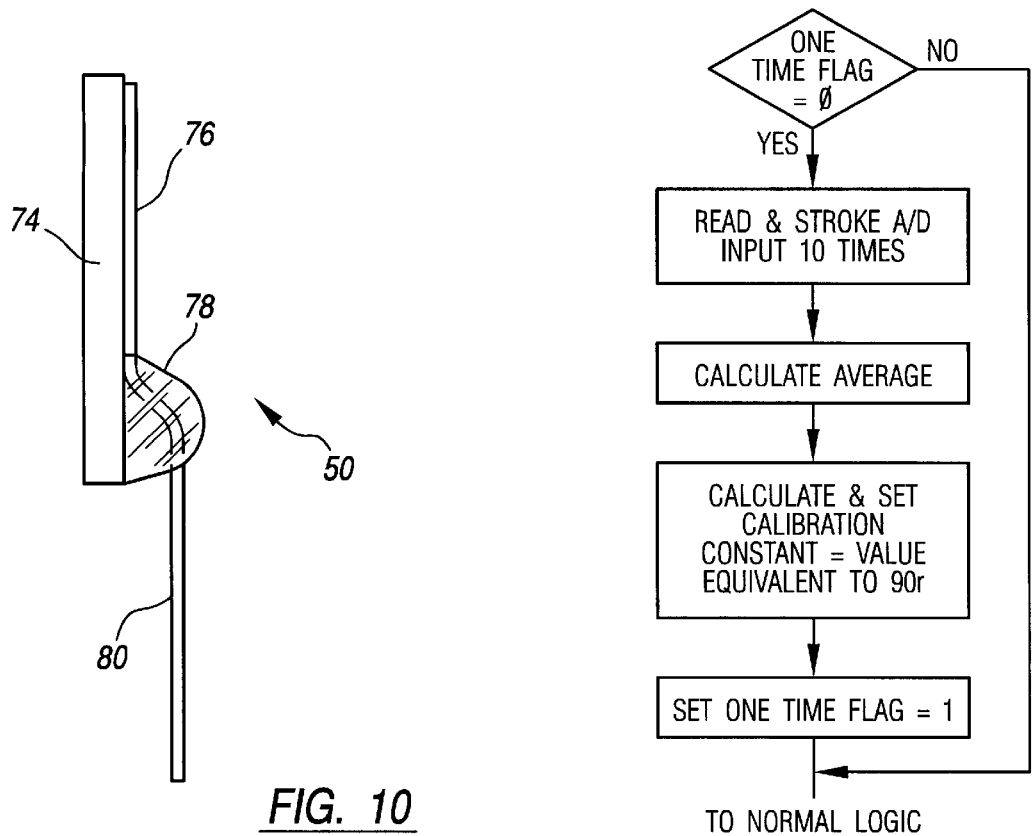
FIG. 10
FIG. 13
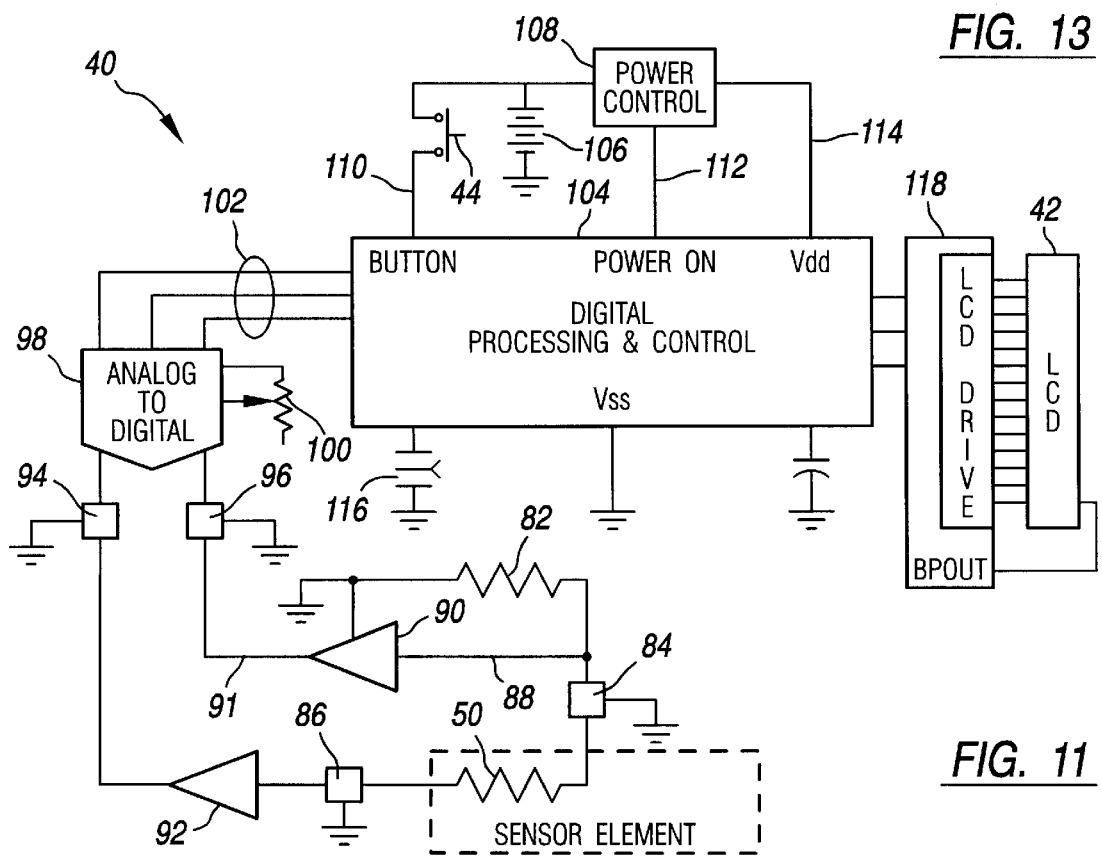
FIG. 11

QUICK REGISTERING THERMOMETER

This is a divisional of U.S. patent application Ser. No. 363,688, filed Dec. 23, 1994, now U.S. Pat. No. 5,725,308, Mar. 10, 1998. The patent application U.S. Ser. No. 363,688 is incorporated herein by reference.

BACKGROUND OF THE INVENTION

This invention relates to thermometers. More particularly it relates to thermometers that display core body temperature from measurements taken at the surface of the human body, such as at the ear.

Body temperature is universally accepted as an important indicator of the physical condition of humans and other warm blooded animals. For many years, the most common method of measuring body temperature was to insert a mercury thermometer into the patient's mouth or rectum. However, conventional mercury thermometers suffer from a number of disadvantages. They are made of glass and are susceptible to breakage. If the glass is broken while the thermometer is in use, the resulting glass debris may cut the patient. The released mercury, if ingested or carried into the bloodstream, can be toxic. In addition, traditional thermometers will not register body temperature until after they are left in the patient's mouth or rectum for several minutes, thus making the measurement slow and uncomfortable.

Advances have been made in thermometers to avoid the fragility and potential toxicity posed by glass and mercury. Examples of thermometers using electronic components are shown in the Cooke U.S. Pat. No. 5,018,875, issued May 28, 1991; the Serperant U.S. Pat. No. 5,056,048, issued Oct. 8, 1991; and the Germanton et al. U.S. Pat. No. 4,536,851, issued Aug. 20, 1985. Use of this technology to measure body temperature results in an electronic version of the traditional glass thermometers; still having to be inserted into the oral or anal cavity. Moreover, this first generation of electronic thermometers continued to suffer from the disadvantages of requiring one to two minutes or longer to register a body temperature.

More recently, instrumentation has been developed to measure human body temperature by remote (i.e., non-contact) reading of the infrared (IR) radiation emissions of the tympanic membrane and the ear canal. This technology is the subject of many patents, including the O'Hara et al. U.S. Pat. No. 4,790, 324, issued Dec. 13, 1988; and the Fraden U.S. Pat. No. 5,178,464, issued Jan. 12, 1993. The IR reading technology also is used in a consumer product marketed by Thermoscan Inc., a San Diego, Calif. company.

The determination of body temperature from an IR read of the ear drum or ear canal avoids the need to insert a probe into the mouth or anus and allows a measurement of body temperature within a few seconds. However, the IR technology is expensive, costing ten times or more than earlier electronic thermometers, and is vulnerable to deterioration of some components as a result of repeated use. For example, the Thermoscan device has an expected life of only 3000 readings before needing replacement.

It is an object of the present invention to provide an electronic thermometer that can register a core body temperature of a mammal without being inserted in the mouth or anus, but without complicated and expensive IR measuring components.

It is another object of the present invention to provide an electronic thermometer that can register a core body temperature of a mammal within seconds of contacting the patient, but without complicated and expensive IR measuring components.

It is still another object of the present invention to provide a thermometer that register a core body temperature within seconds of contacting a patient, but without complicated and expressive IR measuring components.

It is another object of the present invention to provide a thermometer that determines core body temperature with a relatively high degree of accuracy after only a few seconds of contact with the patient.

It is still a further object of the present invention to provide electronic thermometer that is able to register a core body temperature based on a rate of increase in electrical resistance of a sensor in contact with the skin of the patient.

It is yet another object of the present invention to provide an electronic thermometer that registers a core body temperature within seconds of contact of the patient's skin and is able to accurately repeat that determination while continuing to be in contact with the patient's skin.

Further and additional objects are apparent from the following discussion of the present invention and the preferred embodiment.

SUMMARY OF THE INVENTION

The present invention and its various aspects provide for a quick registering thermometer. Generally, the present invention is able to achieve some or all of the objects of the invention by utilizing a sensor that has electrical resistance varying with temperature located at the periphery of a probe, the sensor having relatively small thermal mass and short thermal time constant. Within seconds of contact with the patient, the circuitry communicating with the sensor determines the rate of change in resistance of the sensor. Based on the rate of increase in resistance of the sensor in contact with the surface of the patient, the circuitry calculates and registers the core body temperature.

The sensor is mounted on the periphery of the probe. The portion of the probe surrounding the sensor is made of a thermally insulating material to maximize heat transfer to the sensor and to increase its rate of temperature rise when in contact with the patient's skin. The sensor is mounted on the tip of a flexible probe to obtain good sensor contact with the patient.

The thermometer is capable of detecting small changes in the resistance of the sensor in about three seconds or less after contact with the patient's epidermis, such as the concha of the ear. Electrical noise or interference, a concern when low currents and voltages are used, is avoided by sampling and averaging techniques incorporated in the circuity. Moreover, potentially significant variations in starting temperature of the sensor and its thermodynamic interaction with the patient's skin during and between reads also are taken into account by the circuitry. Accordingly, an accurate registering of core body temperature is accomplished within seconds of contact with the patient.

BRIEF DESCRIPTION OF THE DRAWINGS

Details of the preferred embodiment of the present invention are disclosed in the following DETAILED DESCRIPTION OF THE PREFERRED EMBODIMENT in which reference is made to the drawings and wherein like numerals represent like elements. The following items are depicted in the drawings:

FIG. 10 is a side view of a diagrammatic representation of the temperature sensor;

FIG. 11 is a general schematic representation of the electrical circuitry of the preferred embodiment of the present invention;

FIG. 13 is a flow chart illustrating the automatic calibration routine to calibrate the communication circuits of the preferred embodiment;

DETAILED DESCRIPTION OF THE PREFERRED EMBODIMENT

Figure 1:
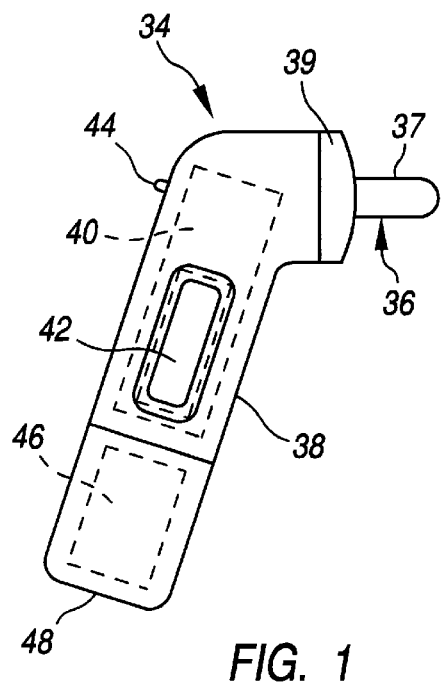
FIG. 1 is a diagrammatic representation of the novel thermometer of the present invention.

The preferred embodiment of the thermometer is energized by activation of a switch. A microprocessor initiates a "hold-on" action to power transistors that maintain the source of power to all circuits. A resistor capacitor clock generator circuit begins functioning and the microprocessor resets to cause a power transistor to remain in an ON state until instructed to change to an OFF state. This entire sequence takes less than 18 milliseconds to occur.

When the switch is pressed, the display circuits and all other logic circuits perform an initialization routine that resets all circuits to a predetermined starting point. The display circuits test and energize all segments of the liquid crystal display ("LCD") and then reset the display to show ON. When ON is displayed, a beeper sounds once to indicate to the user that the thermometer is ready to use. Upon activation, power is applied to the circuits, and all circuits are reset to zero and are ready to be incremented. Further upon activation, all formula logic circuits are cleared and ready to accept input samples. The initialization allows all circuits to stabilize prior to determination of a temperature.

When the thermometer is activated, a controlled amount of voltage or amperage is applied to the resistive temperature sensor. The resistance of the sensor varies with the temperature of the sensor. Preferably the sensor is a resistance temperature device ("RTD"); platinum is the preferred metal through which resistance is measured because it changes resistance linearly in response to changes in temperature, within certain limits. Alternatively, other metals such as copper, nickel and indium, and some alloys can be used. Resistance of the RTD sensor will reduce the amount of amperage passing through the sensor to the amplification circuits in accordance with Ohm's law. With each degree of change in temperature, the resistance of a platinum RTD will change 0.385 ohms.

The signal that comes from the RTD is very small, reducing heating of the sensor by the electricity that flows through it and increasing battery life. This small signal from the RTD is amplified to a level that is large enough to insure proper interpretation by the rest of the circuits. The amplified signal from the amplifier circuits is an analog signal. A digital converter (A-D) is used to generate digital signals representing the analog signals. These circuits convert the continuous analog into a series of "ones" and "zeroes". This series of ones and zeros can be used by a projection formula to represent a single number that can be "plugged" into a formula to calculate a body temperature within three seconds.

The digital processing and control circuit accepts the number that the A-D converter sends and uses it to solve the formula. This circuit then converts the solution to a serial signal and sends it to the LCD display control circuits. This portion of the circuit also controls timing of all functions, turning ON and OFF power, sounding the buzzer, and performing any other functions that are required. All of the functions described above and all of the circuit portions are contained and designed into a single custom IC chip.

The design and construction of the probe portion of the thermometer increases the rate at which the sensor temperature increases in response to contact with skin. The thermometer of the present invention thermally isolates the RTD sensor from other materials in the probe by mounting the RTD in a thermally insulating material. The material chosen for this task preferably types known commercially as SANTOPRENE™ and PLASTIZOTE™. They are chemically inert; normal sterilizing agents used in the medical profession will not affect them.

The preferred material chosen for the thermally isolating material in the probe exhibits low thermal conductivity, specific heat and thermal capacitance properties. Accordingly, the probe material has a longer thermal time constant than the RTD sensor.

The RTD sensor is mounted upon a ceramic substrate such that the ceramic substrate is presented to and contacts the surface site or area whose temperature is to be measured. The RTD is implanted at the surface of the probe. Preferably, the sensor is located at the surface of a deformation that expands the thermal horizon, and the material supporting the sensor in the probe does not conduct, absorb, or radiate thermal energy well; preferably the thermal mass of the sensor is essentially the only material that draws heat energy from the patient's skin or that has its temperature raised when contacting the skin of the patient. This mounting material must not allow thermal energy to radiate to or from it easily.

The shape of the probe and its periphery carrying the sensor are designed to minimize the effect that the supporting material on the thermal interaction of the skin and the sensor. Preferably, the RTD sensor is mounted on the very end or tip of a dome at the end of a cylindrical shaped probe. The sensor is level with or very slightly above the surrounding material, expanding the horizon of the sensor, reducing the thermal influence of the materials that support it and increasing the thermal influence of the contact surface.

The ceramic substrate of the RTD sensor is mounted so that it comes into contact with the surface to be measured. The smooth side of the ceramic substrate is oriented toward the surface to be measured.

By allowing the sensor to "float", the percentage of contact with the surface to be measured can be increased. If normally 30% of the total surface area of a sensor mounted in a rigid sensor mount is brought into contact with the surface to be measured, then a floating sensor mount should allow for 95% of the sensor surface to contact the patient surface. Increased surface-to-surface contact increases the rate of heat energy transfer from the patient to the RTD.

The present invention allows for the calculation of core body temperature prior to reaching thermal equilibrium with either the core temperature or the surface of the body, registering the core body temperature within a few seconds. By knowing the shape of the representative temperature/resistance to time curve of the thermal system, the final temperature can be determined without waiting until thermal equilibrium occurs. The output of the sensor is sampled at several points in time on the sharply ascending portion of the response curve of the sensor to determine the equilibrium temperature of the contact surface.

The rise of low voltage resistance changes to calculate temperature creates the potential for errors due to electrical noise or interference. 60-cycle noise is reduced by reading four values equally spaced during one cycle. The final temperature is a result of information gathered from the sensor during several reading cycles. Each cycle collects four readings from the analog to digital circuits, spaced at 16 millisecond intervals so as to eliminate 60 cycle "noise." Then the microprocessor waits for 100 milliseconds and begins another reading cycle. This continues until 3.2 seconds worth of valid data is collected. If 3.2 seconds of valid data can not be collected in 6.4 seconds of elapsed time, the microprocessor will terminate the current reading attempt and display an error message.

The four values are averaged, resulting in the cancellation of noise induced at a 60-cycle frequency, including most harmonics. Moreover, the preferred embodiment uses only the previous reading and the current reading to uniquely identify a point on a time-temperature curve between a starting temperature and the final temperature given that the thermal constraints of the system are constant. Advantageously, if unexpected readings are encountered, i.e., readings that are significantly different from the previous reading, they are eliminated from the averaging and the number of readings taken is extended before the temperature is registered.

The current readings are stored in a microprocessor as A/D numbers before being averaged and displayed, reducing the number of calculations required to convert from the A-D readings to degrees Fahrenheit or Centigrade. This also maximizes the accuracy of the readings since rounding errors in this conversion can enter the calculations only once rather than at each reading. Also, the readings are taken continuously as long as power is applied rather than initiating a start and stop of readings. In addition, in the preferred embodiment, the readings are always "averaged" in groups that are factors of two (2, 4, 16, etc.). This greatly simplifies the operations by allowing each reading to be shifted in a shift register and added to the final answer register. No actual division subroutine is ever needed.

With specific reference to the drawings, FIG. 1 shows the thermometer 34, including a probe 36, probe tip 37 and a base 39. The housing 38 to which the probe 36 is attached includes an electronics assembly 40, a temperature display 42, and a switch 44 for energizing the electronics assembly 40. A battery compartment 46 is provided in battery cover 48. A resistance temperature device is mounted in the apex of the outer hemispherical end of probe tip 37.

Figure 2:
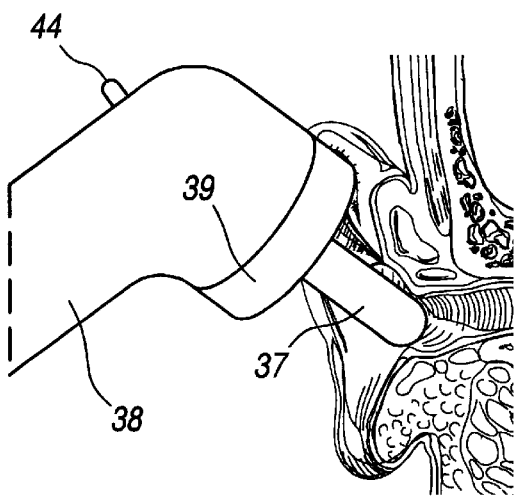
FIG. 2 is a diagrammatic representation of the novel thermometer of the present invention contacting a portion of an ear of a person.

The thermometer is designed to register core body temperatures based on the surface temperature of the patient. Temperature readings can be taken at pulse points such as the wrist, under the arm, behind either knee, in the exterior ear, on the forehead, on the top of or under the tongue, or other sites that can be reached with the probe of the thermometer. In the preferred embodiment, the contact point is the concha of the exterior ear as illustrated in FIG. 2.

Commercial electronic thermometers have temperature sensors buried in rigid material to protect both the electronic components and the patient. This has the effect of increasing the thermal mass of the sensor increasing the time that it takes for the sensor to register the thermal energy. In the preferred embodiment of the present invention, however, the RTD sensor is mounted so that the ceramic substrate on which the resistance temperature device is formed is presented to the site to be measured. Further, the RTD is mounted on the outer end of and slightly above the probe tip to reduce the thermal horizon. Primarily the sensor, and not the probe, will respond to the thermal energy present at the target site during the short contact period.

Figure 3:
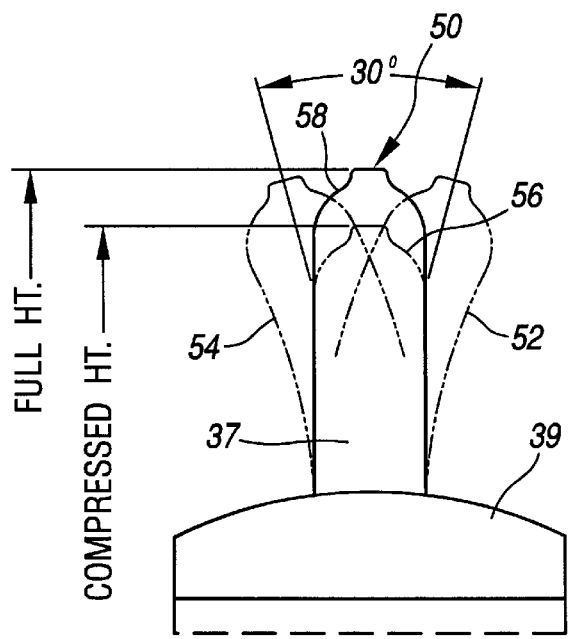
FIG. 3 is a side view of the probe tip of the present invention illustrating the location of the temperature sensor and the mobility of the probe tip.

Probe 36 is illustrated in a side view in FIG. 3. The sensor 50 is mounted in a relatively thermally and electrically nonconductive probe tip 37 that is integrally formed with the probe body 39. Preferably, the compliant probe tip 37 is made of a material that will minimize thermal radiation to or from it. The thermal conductivity rating of the material is no greater than about 0.60 BTU inches per hour per square foot at mean of 50 degrees Fahrenheit.

Preferably, the thermal conductivity rating of the material is no greater than about 0.33 BTU inches per hour per square foot at mean of 50 degrees Fahrenheit. The preferred material is thermoplastic rubber, such as SANTOPRENE™, or polyethylene foam, such as PLASTIZOTE™.

The tip is substantially cylindrical or tubular having a hemispherical outer surface 58 with the RTD sensor 50 mounted at the apex thereof such that the sensor is very slightly above the outer surface 58 of the hemisphere. This has the effect of expanding the horizon of the RTD sensor 50. By expanding the horizon of the RTD sensor 50, it is then less influenced by the material in the probe tip 37 that supports it and is more influenced by the thermal mass of the surface whose temperature is being measured. This acts to reduce the effect that the supporting material will have on the thermal system comprising both the skin and the RTD sensor 50. As noted in FIG. 3, the probe tip 37 is compliant and will move from the center to the right as shown by phantom lines 52 or to the left as shown by phantom lines 54. It may also be compressed downwardly to the position shown by phantom lines 56.

The RTD sensor 50 including the ceramic substrate and the platinum trace deposited thereon is mounted on the end of the probe tip so that it comes into physical contact with the surface to be measured. By presenting the blank side of the ceramic substrate toward the surface to be measured, no material will be heated or cooled before the sensor except the thin ceramic substrate, which has a low thermal mass and is thermally conductive, thus reducing the response time of the device.

Further, by allowing the sensor to "float" as shown in FIG. 3 where the various floating positions are illustrated in phantom lines, the percentage of contact of the sensor with the surface to be measured can be increased. Thus if normally 30% of the total surface area of the sensor is brought into contact with the surface to be measured when it is mounted in a rigid sensor mount, a floating sensor mount as shown will allow for a 95% of the sensor surface to contact the patient. By increasing the amount of surface-to-surface contact, more thermal energy from the target surface can affect more of the platinum sensing element in a shorter period of time thus not relying on convection, radiation, or capillary action to convey the thermal energy to the sensing element. The compliant probe tip 37 is integrally formed with and a part of the probe body 39 which attaches to the thermometer body or housing 38 as shown in FIG. 1 using integrally formed shoulder 66 shown in FIG. 7 and as will be explained hereafter.

Figure 4:
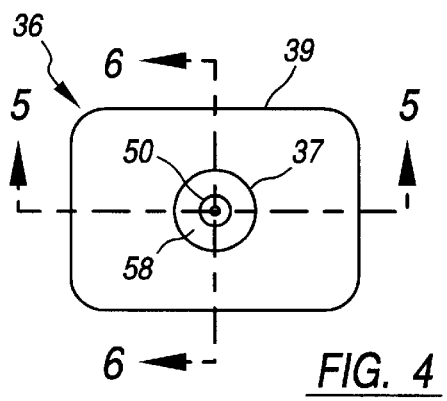
FIG. 4 is a plan view of the probe tip of the present invention.
Figure 6:
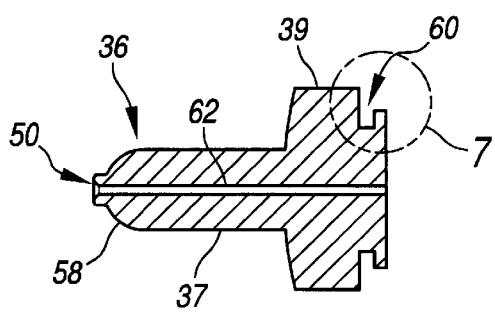
FIG. 6 is a cross-sectional view of the probe tip taken 90° with respect to the cross section illustrated in FIG. 5 and taken along lines 6—6 of FIG. 4.
Figure 5:
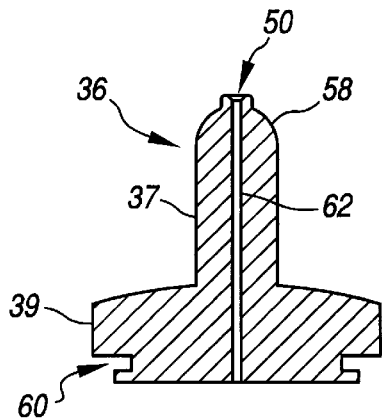
FIG. 5 is a cross-sectional view of the probe tip taken along lines 5—5 of FIG. 4.

A top or plan view of the probe 36 is shown in FIG. 4. The probe body 39 is substantially rectangular in shape while the compliant probe tip 37 is cylindrical or tubular in shape and is elongated. A cross-sectional view taken along lines 5—5 in FIG. 4 is shown in FIG. 5 and a cross-sectional view taken along lines 6—6 of FIG. 4 is shown in FIG. 6. In both of these cross-sectional views, there can be seen an attaching area 60 where the compliant probe tip 37 and body 39 are attached to the thermometer housing 38 as will be shown in more detail in FIG. 7. Further, in both FIGS. 5 and 6, an orifice 62 can be seen extending from the probe sensor area 50 through the compliant probe tip 37 and probe body 39 so that electrical leads from the sensor 50 can be coupled to the appropriate circuitry within the thermometer body or housing 38.

Figure 7:
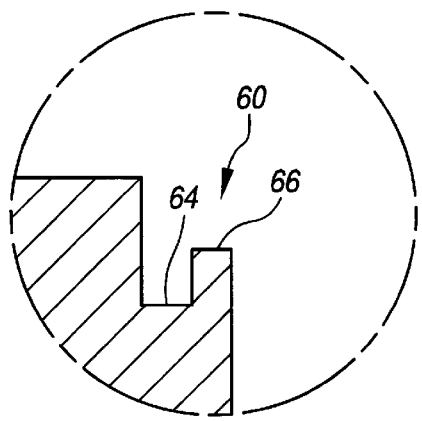
FIG. 7 is a detail of the shoulder with which the probe tip is attached to the body of the thermometer shown on FIG. 1.

The detail shown in FIG. 7 illustrates the attaching device 60, which includes a recess 64 and a shoulder 66. The housing 38 of the thermometer can be of the type that splits in half with a corresponding lip (not shown) thereon that can be inserted in or mated with the groove or recess 64 and, when the two sides of the housing 38 are attached to each other, it attaches also to the probe tip 36. The recess 64 and the shoulder 66 act as a "capture collar," joining the probe to the housing body.

Figure 8:
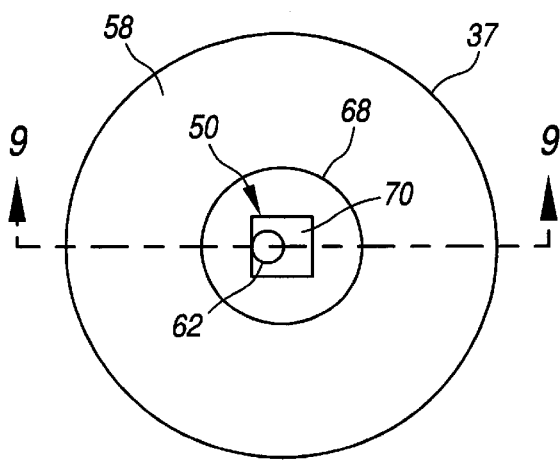
FIG. 8 is a top view of the outer end of the probe tip illustrating the manner in which the sensor is mounted therein.

FIG. 8 is a top view of the compliant tip 37 illustrating the outer hemispherical portion 58 with an area 70 for inserting the sensor and the orifice 62 through which the sensor leads are coupled to the circuits within the thermometer housing 38. The orifice 62 may have a diameter of 0.040 of an inch while the recess 70 for the sensor may be a square with one side having a dimension of 0.07874 inch.

It may be desirable for certain applications of the present invention for a sanitary probe cover (not shown in the drawings) to be used. Replacement of such a cover between uses on different portions of a person's body or between uses on different persons might reduce or prevent the possibility of transfer of bacteria or viruses. The design of a disposable probe cover for such applications is within the ability of an ordinarily skilled worker in the field. Use of a thin cover made of a material having high thermal conductivity will not detract from the purposes and goals of the present invention as described herein.

Figure 9:
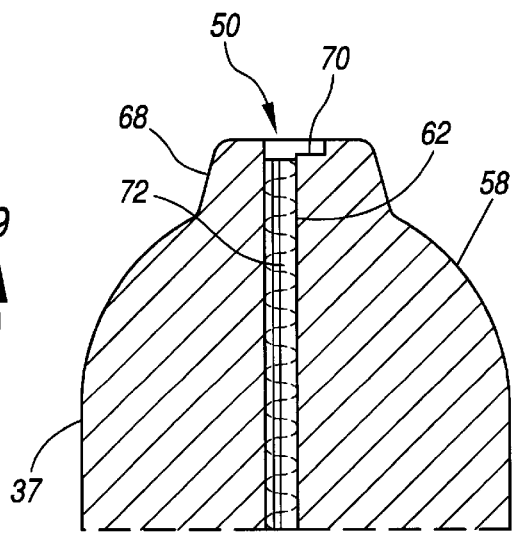
FIG. 9 is an enlarged cross-sectional view of the outer end of the probe tip.

FIG. 9 is a cross-sectional view taken along lines 9—9 of FIG. 8. The outer portion 58 of the pliable probe tip 37 is substantially hemispherical in shape with a raised portion 68 at the apex thereof and having therein the recess 70 for receiving the RTD sensor of the present invention. The orifice 62 communicates with the recess 70 and may have therein the electrical leads 72 that connect the sensor 50 to the electrical circuits 40 in the housing 38. They may be substantially S-shaped as shown so that metal fatigue caused by movement of the sensor tip 37 as illustrated in FIG. 3 may be minimized.

The detail of the RTD sensor is shown in FIG. 10. FIG. 10 is a partial side view of the sensor 50. In FIG. 10, the side view of the sensor 50, it can be seen that a ceramic substrate 74 has deposited thereon in a well-known fashion platinum traces 76. Lead wires 80 are coupled to the platinum traces and, at the joint where the coupling takes place, a bead 78, made of glass, plastic or other suitable material, is placed over the joint or coupling for strain relief of the lead wire connections. The size of the RTD sensor 50 is approximately 2 mm×2.3 mm×0.43 mm. The ceramic substrate 74 has a high thermal conductivity and is about 0.25 millimeters in thickness, conducting heat to the platinum traces 76 on the other side thereof. Thus it is the ceramic substrate 74 upon which the platinum sensor traces are deposited that comes into contact with the surface whose temperature is to be measured.

The RTD 50 is an active type sensor. That means it is a sensor that requires an external power source to make the sensor operate. Because of this characteristic, self-heating of the sensor is a concern. Self-heating errors are caused by current flowing through the sensor. Resistance to the flow of electricity will cause heat to be generated by the sensor and not the target being measured.

In the preferred embodiment of the present invention, the thermal density of the RTD is about 4 grams/cubic cm and the thermal mass is about 2 cubic grams. Further, the RTD sensor is isolated from the thermal mass of the surrounding probe tip and thus the speed at which the sensor responds is increased. In the preferred embodiment, a small current in the order of 0.001 amps, is supplied to the sensor. By measuring the change in resistance (specifically, change of amperage as a result of change in resistance), an accurate temperature can be obtained. This small current also minimizes the self-heating that will occur due to the resistance to the flow of electricity.

In general, the measured signal is fed into an amplifier circuit that will bring it to a level that can be easily used by the other circuits. After amplification, the signal is sent to circuits that convert the amount of electricity from an analog signal to digital signals. The digital signals then fed into and used by the computer circuits. The computer utilizes the digital signals, which are samples, by introducing the samples as known values into a formula to determine the numbers that will be displayed for the user. Once the number is determined, the information is sent to the display circuits.

FIG. 11 is a generalized circuit diagram of the electronics of the present invention. As can be seen, the sensor element 50 is coupled in series with a reference resistance 82. The reference resistance 82 has a resistance value equal to that of the sensor 50 when the sensor 50 is at the minimum temperature to be measured by the unit. The voltage drop across the reference resistance 82 is coupled on line 88 to amplifier 90 where it is amplified by exactly 2.000, thus producing a voltage on its output 91 that is equal to that found across sensor 50 at the minimum measured temperature. The voltage drop across the sensor 50 and the reference resistance 82 is coupled through filter 86 to amplifier 92. Filters 84 and 86 are both high and low-pass filters to filter noise out of the system. Amplifier 92 amplifies the signal across the RTD sensor 50 and the reference resistance 82 to an amount sufficient to be utilized by the analog-to-digital converter 98. Again, filters 94 and 96 are coupled to the inputs to the A-D converter 98 to filter out any high and low frequency noises. A-D converter 98 has 12 data bits of resolution and converts the difference in the signals from the two amplifiers 90 and 92 into a digital signal. This signal is coupled on lines 102 to the digital processing and control unit 104 which, of course, may be a simple microprocessor. Battery 106 is coupled to initializing switch 44 that produces an output on line 110 to initiate a temperature reading process. Power control unit 108 generates output signals from lines 112 and 114 to power the digital processing and control network or microprocessor 104. The output of the microprocessor 104 is coupled to the LCD drive 118 that drives out a four-digit LCD 42 to display the temperature digitally.

Figure 12:
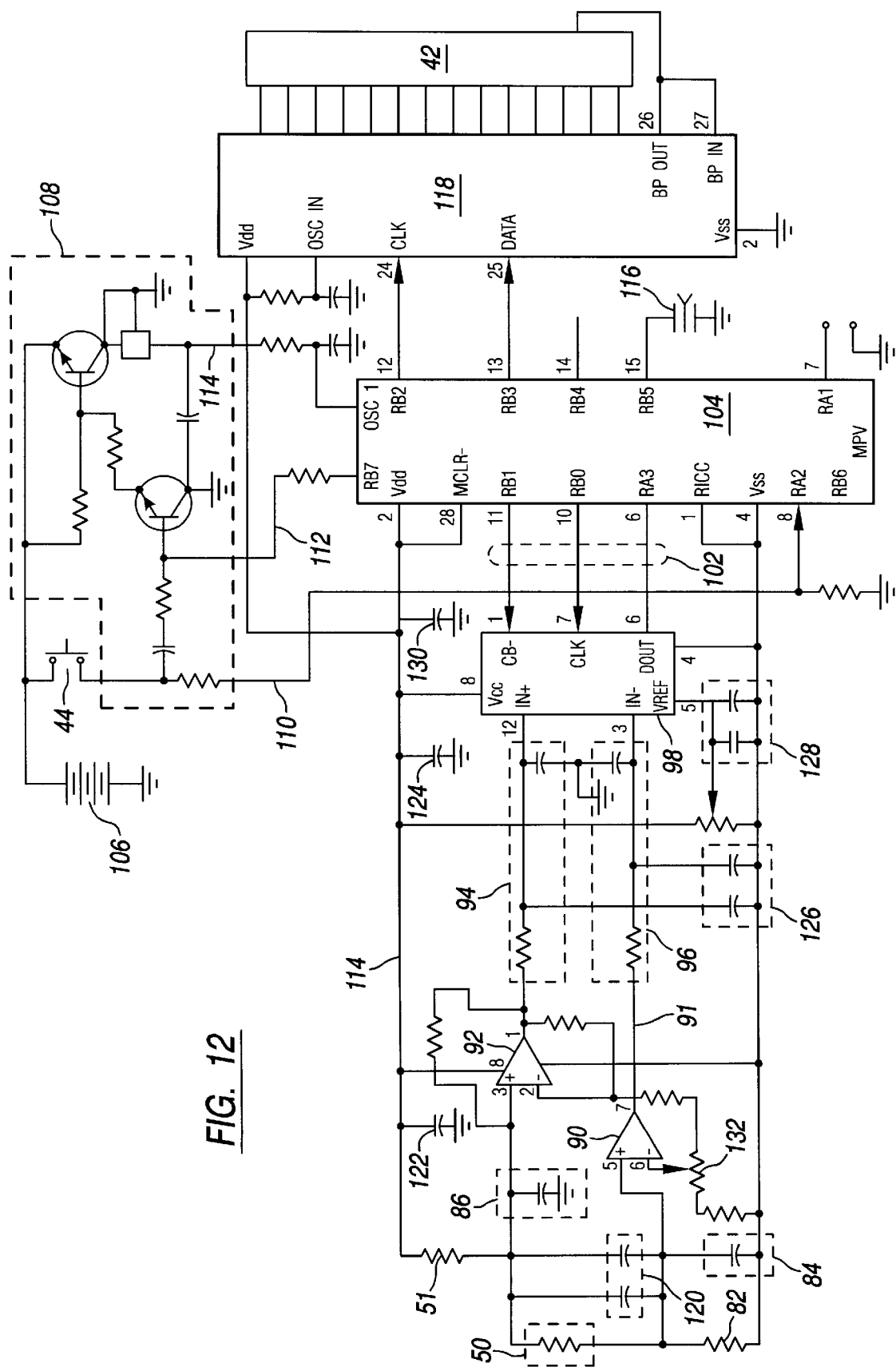
FIG. 12 is a detailed circuit representation of the electrical circuitry of the preferred embodiment of the present invention.

FIG. 12 discloses the details of the generalized circuit shown in FIG. 11. When push-button 44 is activated, the battery 106 energizes power control unit 108 that produces a very carefully controlled or regulated voltage on line 114 that is coupled to the sensor unit 50. It causes a small continuous current to flow through the sensor during measurement. The current flowing through the sensor is controlled by resistor 51 connecting the regulated source to the top end of the sensor element 50. This current is given by Ohm's Law or I=V/R which equals 5/(R51, sensor 50, and R82). The result is approximately 1 milliamp. There is a trade off between higher currents giving more voltage drop across the sensor 50, and therefore having to amplify the resulting signal less, or using lower current and having less of the self-heating effect present. A practical range is from 0.1 milliamp to 2.0 milliamp.

In order to minimize noise in the sensor input area, capacitors 84 and 86 are connected from both ends of the sensor 50 to ground. Further, capacitor unit 120 is connected across the sensor input terminals immediately where they enter the printed circuit board. Unit 120 consists of a 0.1 mFd ceramic capacitor to filter very high-frequency interference and is paralleled with a 10 mFd tantalum electrolytic capacitor to filter low-frequency noise. Electrolytic capacitors are available in values greater than 1 mFd and as such can be used to provide filtering to remove noise components of relatively low frequency. However, they exhibit an equivalent series resistance which increases for frequency, such that they are unable to effectively shunt to ground frequencies in the range above 10 mHz. Monolithic ceramic construction capacitors, on the other hand, are not available in values large enough to provide effective low frequency filtering. Available values are typically less than 1 mFd and range on down to 2 pFd. They do have a very low equivalent series resistance even at frequencies up to several hundreds of megahertz. Thus the 0.1 mFd and 10 mFd capacitors in unit 120 are paralleled to provide the proper filtering.

As stated in relation to FIG. 11, the off-set correction resistor 82 in series with the RTD element 50 has a value equal to that of the RTD sensor element 50 when it is at the minimum temperature to be measured by the unit. The voltage drop across resistor 82 is amplified by amplifier 92 by exactly 2.000, thus producing a reference voltage output on line 91 that is equal to that found at the sensor 50 at the minimum measured temperature. The output of amplifiers 90 and 92, the difference between the reference voltage and the actual sensor voltage, is then amplified by a factor sufficiently large for the analog-to-digital converter 98 to convert to digital data.

An additional resistor is connected from the output of amplifier 92 at one pin to the non-inverting input of the amplifier 92 at another pin. This feeds a small portion of the amplified output back to the non-amplified input so as to increase the linearity of the signal from amplifier 92, improving the quality of the amplified signal to the A/D converter.

Low-pass filter unit 94 is coupled to the output of amplifier 92 and comprises a 50 ohm series resistor and a 0.1 mFd ceramic capacitor. In addition, low-pass filter 96 is coupled to the output of amplifier 90 on line 91 and comprises a 50 ohm resistor and a 0.1 mFd ceramic capacitor. Extensive additional filtering is provided. Note capacitors 122, 124 and 130 filter the 5-volt regulated source on line 114. Capacitors 122 and 130 are 0.1 mFd ceramic capacitors, while capacitor 124 is a 22 mFd tantalum capacitor. In actual practice, capacitors 124 and 130 are coupled very close to the input pin of the IC chip forming the analog-to-digital converter 98. In addition, the two capacitors in the low-pass filters 94 and 96 are also coupled very close to their respective input pins to the IC chip of the analog-to-digital converter 98. Capacitor unit 126 comprises a 0.1 mFd ceramic capacitor coupled from the output of amplifier 92 to ground while the other capacitor is a 10 mFd tantalum capacitor connected from the output line 91 of amplifier 90 to ground for both high frequency and low frequency filtering. Capacitor unit 128 provides high frequency and low frequency filtering at the voltage reference input to the analog-to-digital converter 98 and is coupled very close to the respective pin of the IC chip forming the analog to digital converter 98. Again they comprise a 0.1 mFd ceramic capacitor and a 22 mFd tantalum capacitor in parallel to provide both high and low frequency filtering. Thus, extensive filtering is utilized in the input circuits from the sensor 50 to the analog-to-digital converter 98.

The microprocessor 104 receives the digital output on lines 102 from the analog-to-digital converter. It samples the analog-to-digital converter output by reading four values equally spaced during one cycle to reduce 60-cycle noise. The four values are then averaged resulting in the cancellation of noise induced at a 60-cycle frequency as well as most of the harmonics. It is of no concern at what point in a 60-cycle waveform that the reading is started. Any positive offset would be corrected by an equal negative offset one-half cycle later. The 60-cycle harmonics are eliminated in a similar manner.

The thermal characteristics of the resistance temperature device sensor 50 and its support assembly are such that the temperature of the sensor unit 50 rises to its equilibrium temperature too slowly to be displayed directly. The microcomputer 104 uses the fact that the temperature will rise exponentially to anticipate the stabilized final temperature.

The equation to describe the temperature change of a small body from one stable state to another is:

$$T_x = T_i + (T_f - T_i) * (1 - e^{-0.1k}),$$

where $T_x$ = the instantaneous temperature, $T_i$ = the initial temperature, $T_f$ = the final temperature, k = the coefficient of heat transfer, and T = the amount of time since the initial temperature measurement.

The equation can be solved if it is broken down into fixed time increments. If the equation is rewritten for a single discrete time interval, T, it can be written:

$$T_{n1} = (T_{n0} + T_f - T_n) * (1 - e^{-0.1k}),$$

where $T_{n1}$ = the temperature at time N+1, $T_{n0}$ = the temperature at time N, $T_f$ = the final temperature, k = the coefficient of heat transfer, and T = the time since the first measurement.

T is a constant. Time increments can be arbitrarily defined to be 0.1 seconds so the equation resolves to:

$$T_{n1} = T_n + (T_f - T_{n0}) * (1 - e^{-0.1k})$$

Another feature the equation has is that nothing limits the $T_{n0}$ since it can be measured at any time and the equation defines the $T_{n1}$ that will be calculated at 0.1 seconds later. The final temperature $T_f = (T_{n1} - T_{n0})/(1 - e^{-0.1k}) + T_{n0}$ By measuring the temperature on a fixed interval of 100 milliseconds, $T_{n0}$, the first reading and $T_{n1}$, the second reading, are known and k, the heat transfer coefficient, can be determined experimentally. These two readings can then be utilized to determine the expected final stable temperature that would be obtained if the period of time were extended indefinitely.

$T_{n1}$ can be shifted to be $T_{n0}$ for the next pair of readings and another reading taken. This pair can also be inserted into the equation to get another estimate of the final temperature. As long as the physical characteristics of the system do not change, the same result will be obtained no matter when the readings are taken so long as they are 100 milliseconds apart. Further, on the same assumption, it makes no difference what the initial or final temperatures are.

To anticipate or predict the temperature toward which the readings are arising, the final temperature, the circuitry uses only the previous reading and the current reading. These two readings uniquely identify a point on the response curve of the RTD sensor between a starting temperature and the final temperature given that the thermal constants of the combined system are constant. Thus, two points taken a fixed time apart describe the final temperature no matter when the first of the two readings is taken as previously shown mathematically.

While reading temperatures, if the microprocessor encounters an unexpected reading such as a significantly different reading from a previous reading, such unexpected reading is eliminated from the averaging by the computer program driving the microprocessor 104 and the number of readings taken is extended before the display is enabled. This increases the confidence level of the displayed value since it is composed of the average of many readings that were relatively constant.

The use of the equation to predict an answer rather than waiting for a stable reading means that the display is more susceptible to noise. A noisy reading from the RTD sensor and circuits will predict an erratic answer. To avoid this potential problem, readings that are substantially different from the last reading are eliminated. If instead of averaging 20 readings, only 10 readings are used because of eliminating noise, the result might be significantly more unreliable. Therefore, when readings are eliminated, the amount of time needed to get a final reading is extended ensuring that when a result is obtained it is composed of a minimum number of consistent readings. This same result could be obtained in a hardware circuit.

In the microprocessor 104, the digital readings are stored (before being averaged and displayed) as final analog-to-digital readings rather than temperatures. This reduces the number of calculations since it is required to convert from A-D readings (0–1024) to ° F. or ° C. only once rather than after each A-D reading is taken. This also maximizes the accuracy of the readings since rounding errors in this conversion can enter the calculations only once rather than at each reading.

Again, the operation of the microprocessor 104 is simplified by continuously reading the RTD output as long as power is applied rather than initiating a start and a stop at readings. When the switch 44 is activated to initiate a reading, it initiates a counter that determines when to display the average temperature seen during the past three seconds. The significance of this operation is the appearance of a device that gives a reading only when requested (switch 44 has been depressed) while in reality, the device is simplified by continuously taking readings and pressing the button only initiates the display of the answer. A piezoelectric element 116 is driven by the microprocessor to indicate that the unit is ready to take a temperature. It generates a sound such as a "beep" that is sounded by the same routine that is checking to see if 100 milliseconds has expired since the last RTD reading was taken. To sound the beeper, the computer simply sets a common flag from any point and this routine, seeing the flag set, will initiate the oscillation at the output pin that results in the sound. This routine also controls the resetting of the flag after the appropriate time needed to generate a pleasant sound.

Further, to simplify the operation of the computer, where division by a negative constant is required, first the deviser is negated. Next the reciprocal of the constant is entered allowing the compiler to do the division rather than the target processor. The numbers can then be multiplied, which is computational much easier. Thus, rather than $$C=A/-B$$

the computer performs $$C=-A*(1/B)$$

Thus the computer does the division 1/B and the result is multiplied with −A.

Further, to do the averaging, the readings are always averaged in groups that are factors of two (2, 4, 8, 16, and so forth). This greatly simplifies the software by allowing each reading to be shifted in a first register and added to the final answer register. No actual division subroutine is ever needed. This simplifies the software and reduces rounding errors.

The output of the microprocessor is coupled to the LCD driver 118. LCD driver 18 operates the display 42 by turning on each segment independently. This is a function of the hardware chosen. If wiring of the printed circuit board is such that there is no correlation between the segment wire to any particular output pin, the energization of each segment is determined by the format of digits in the processor. The normal method of solving this problem could be to decide whether each bit should be energized or de-energized one-at-a-time.

The processor uses a look-up table of "fonts". Instead of going through the segments one-at-a-time and deciding whether they should be energized based on the number to display, the program takes the number to display and reads a table entry corresponding to that number. This table entry contains a set of eight segments and the status they need to display that number. Thus, to display the number 98.6, the outputs to the display buffer are generated by looking up the ninth entry plus the eighth entry followed by the sixth entry. In order words, the number is converted from binary to binary coded decimal and then each digit is displayed. A by-product of this method is that there are six additional "fonts" in each byte. By creating a BCD number with individual digits between 10 and 15 decimal, the words "ON", "C", "HI", "LO" and so forth can be displayed.

FIG. 13 is a flow-chart representing a portion of the circuitry routines incorporated into the circuitry. It is intended to provide a way of calibrating the device after production, but before receipt by the consumer. It will normally only be used once to calibrate the particular thermometer, taking into account variations introduced at the time of the manufacture.

FIGS. 14 through 31 are flow chart representations of various routines and subroutines utilized in the manipulation of information in the circuitry of the preferred embodiment. They are intended to show, individually and as a group, the various steps of the circuitry used to display a core body temperature as a result of contact between the sensor and the skin or other portion of the patient.

Figure 14:
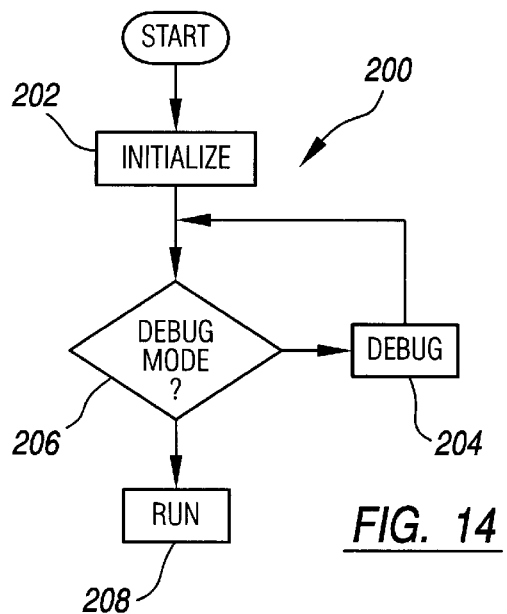
FIG. 14 is a flow chart illustrating an overview of the general relationship of the start, initialize, debug and run routines used in the circuitry of the preferred embodiment.
Figure 15:
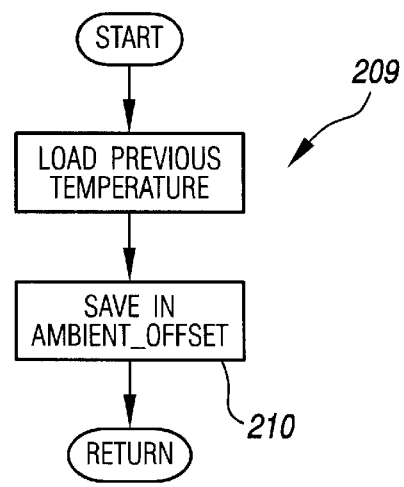
FIG. 15 is a flow chart illustrating the routine used to save the ambient resistance or temperature reading in the circuitry of the preferred embodiment.
Figure 21:
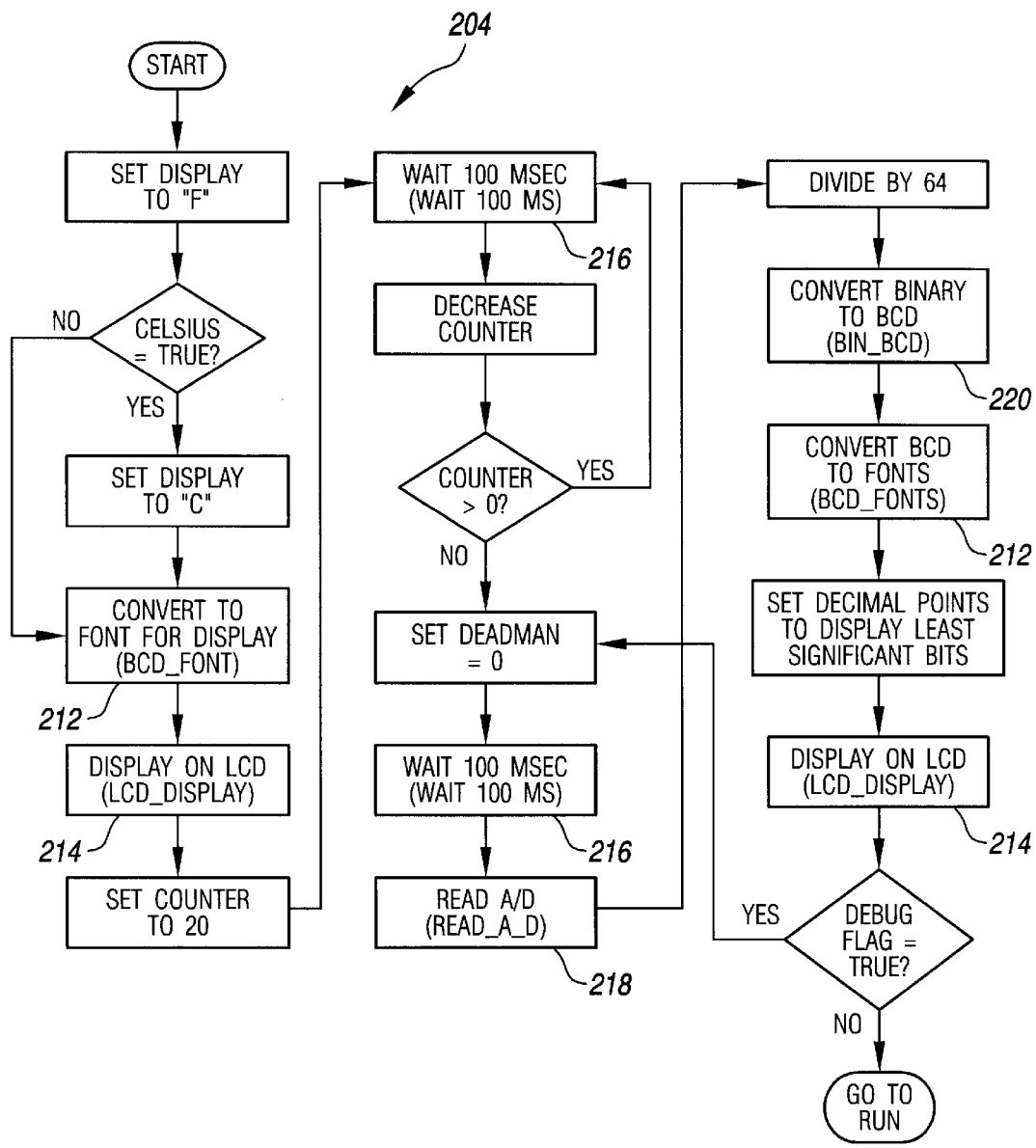
FIG. 21 is a flow chart illustrating the routine for displaying the raw A/D numbers that the A/D circuits provide the program in the circuitry of the preferred embodiment.
Figure 24:
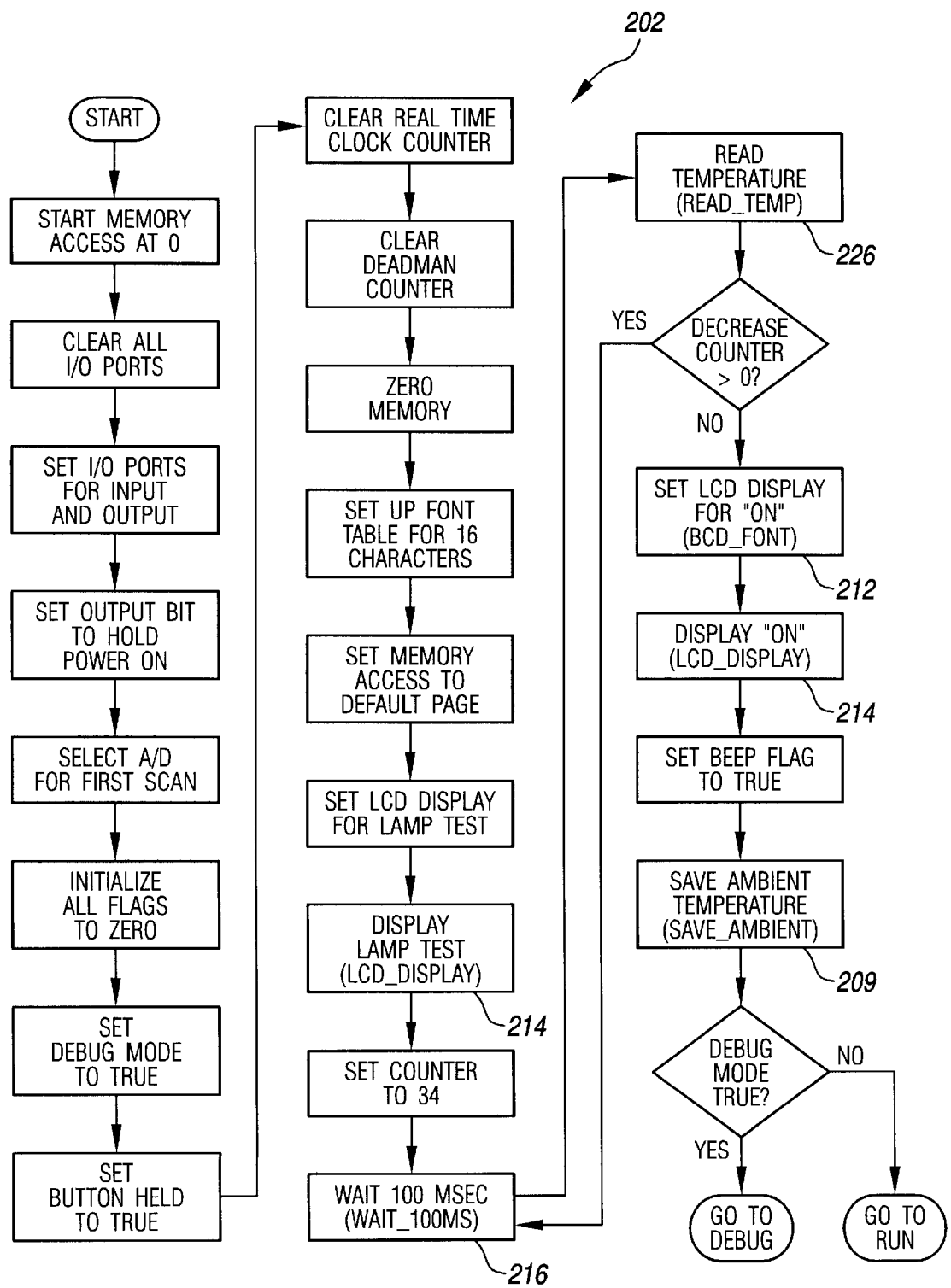
FIG. 24 is a flow chart illustrating the routine to initialize all portions of the thermometer circuitry, resetting values to a known starting point upon activation of the thermometer in preparation for taking a reading in the circuitry of the preferred embodiment.
Figure 30:
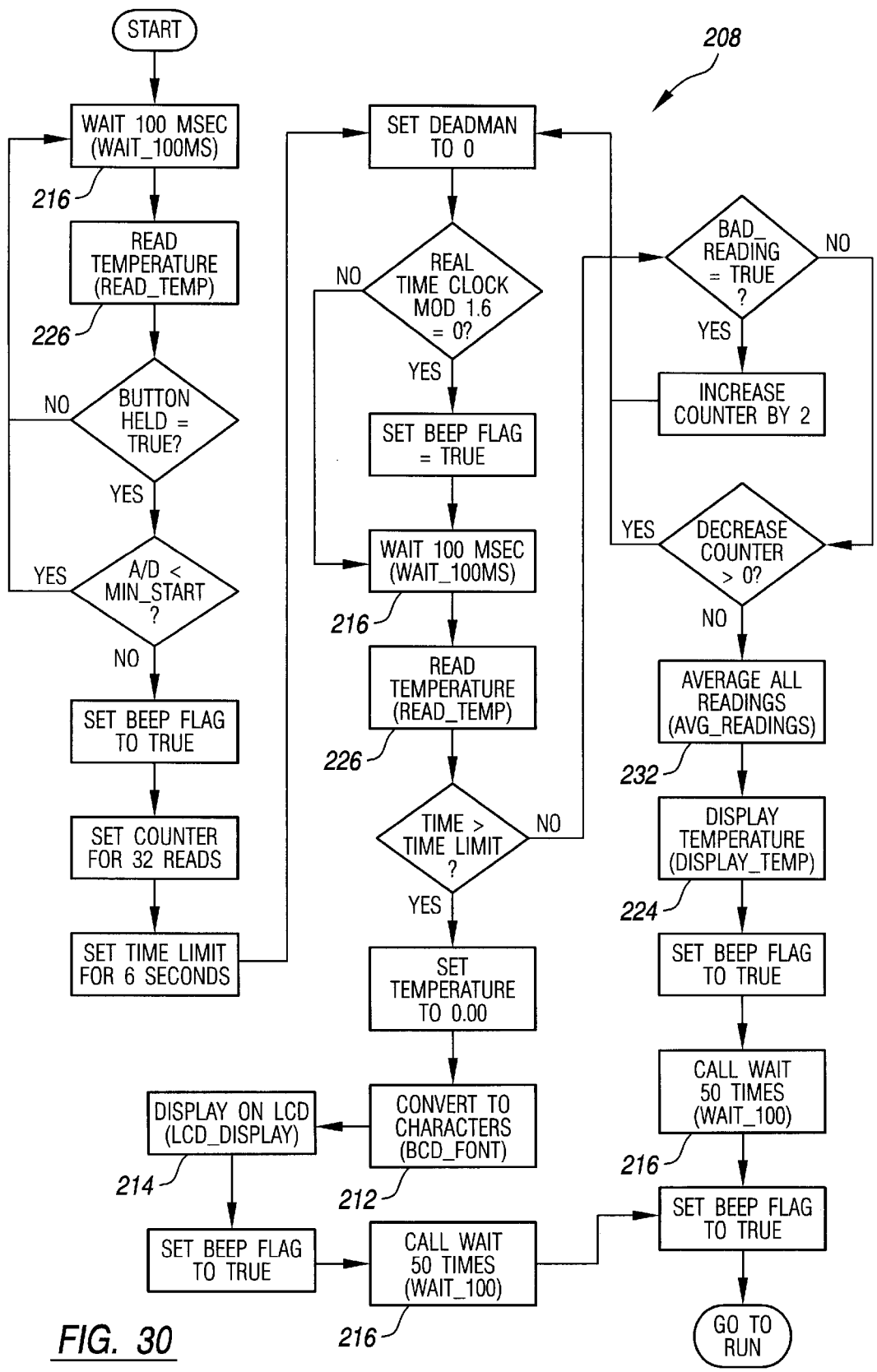
FIG. 30 is a flow chart illustrating the interrelationship of other routines when the circuitry of the preferred embodiment is operated to register a core body temperature; and, FIG. 31 is a flow chart illustrating the routine to assure a 100 millisecond delay and subordinate operations within the circuitry of the preferred embodiment.

FIG. 14 shows the general overview 200 of the main routines used in the preferred embodiment including the initialize routine 202, shown in more detail in FIG. 24, the debug routine 204, shown in more detail in FIG. 21, the debug mode determination routine, and the run routine, shown in more detail in FIG. 30. FIG. 15 shows a routine 209 for saving a value associated with the resistance (temperature) of the sensor at the time the device is initially activated. This value is stored as an "ambient offset" later recalled and used in the routine appearing in FIG. 22.

Figure 16:
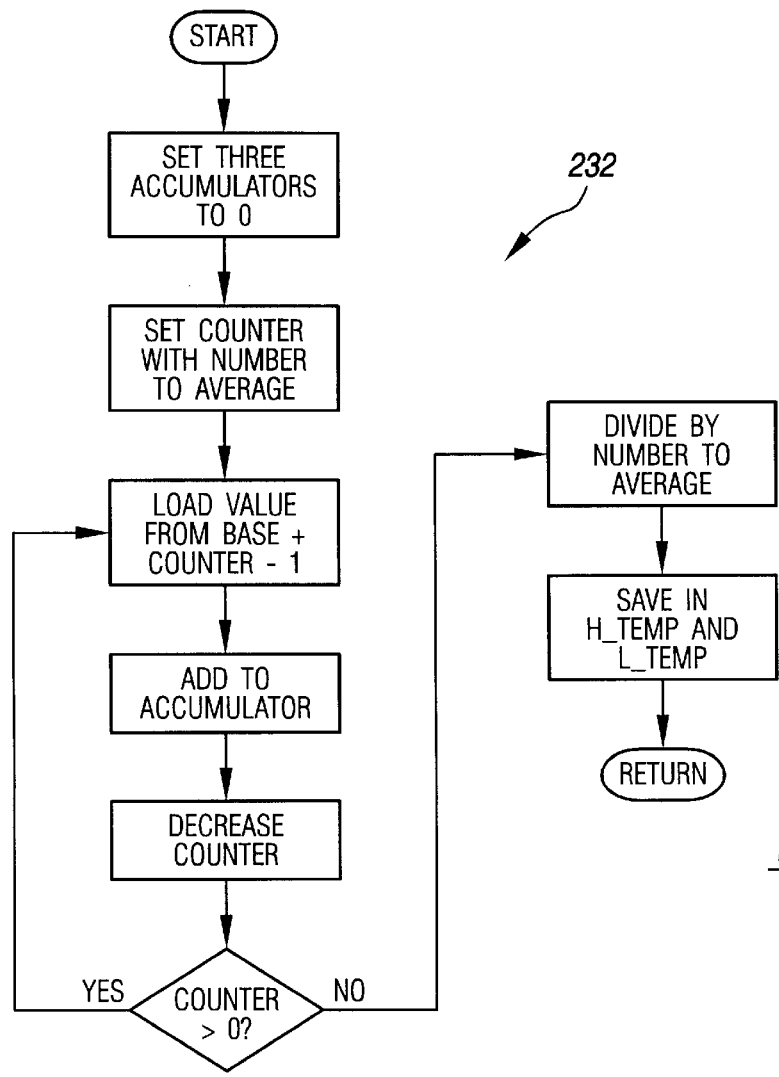
FIG. 16 is a flow chart illustrating the routine used to average the resistance or temperature readings in the circuitry for the preferred embodiment.
Figure 17:
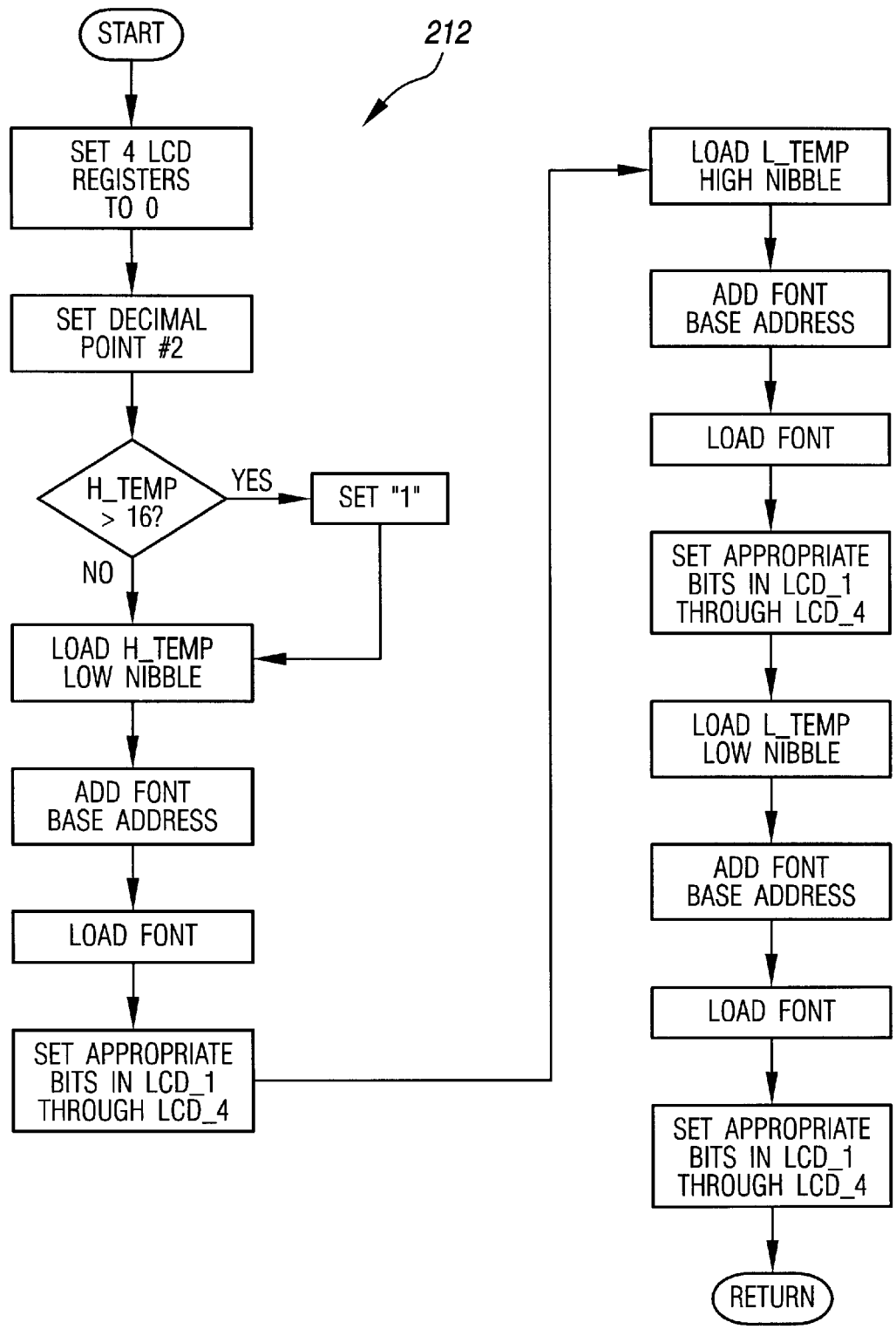
FIG. 17 is a flow chart illustrating the routine used to convert binary information to alphanumeric characters in the circuitry of the preferred embodiment.
Figure 18:
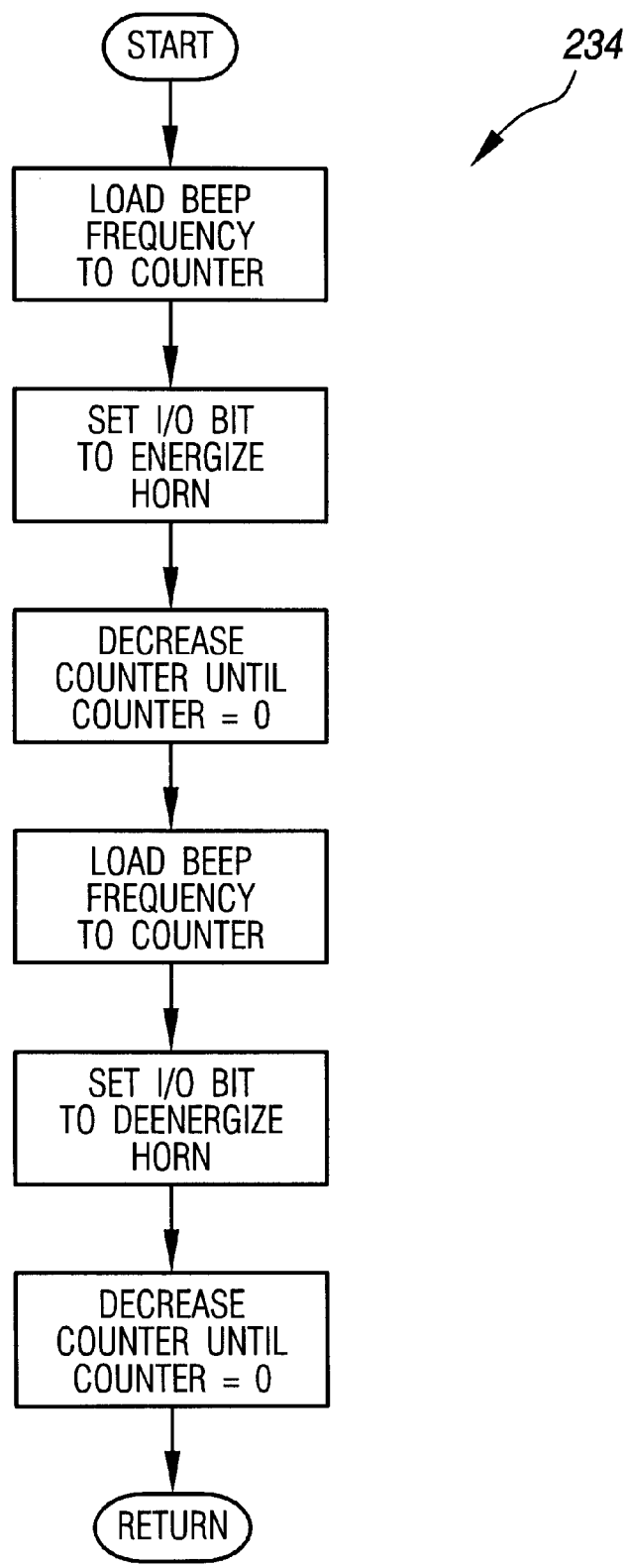
FIG. 18 is a flow chart illustrating the routine to actuate a sound in the circuitry of the preferred embodiment.
Figure 19:
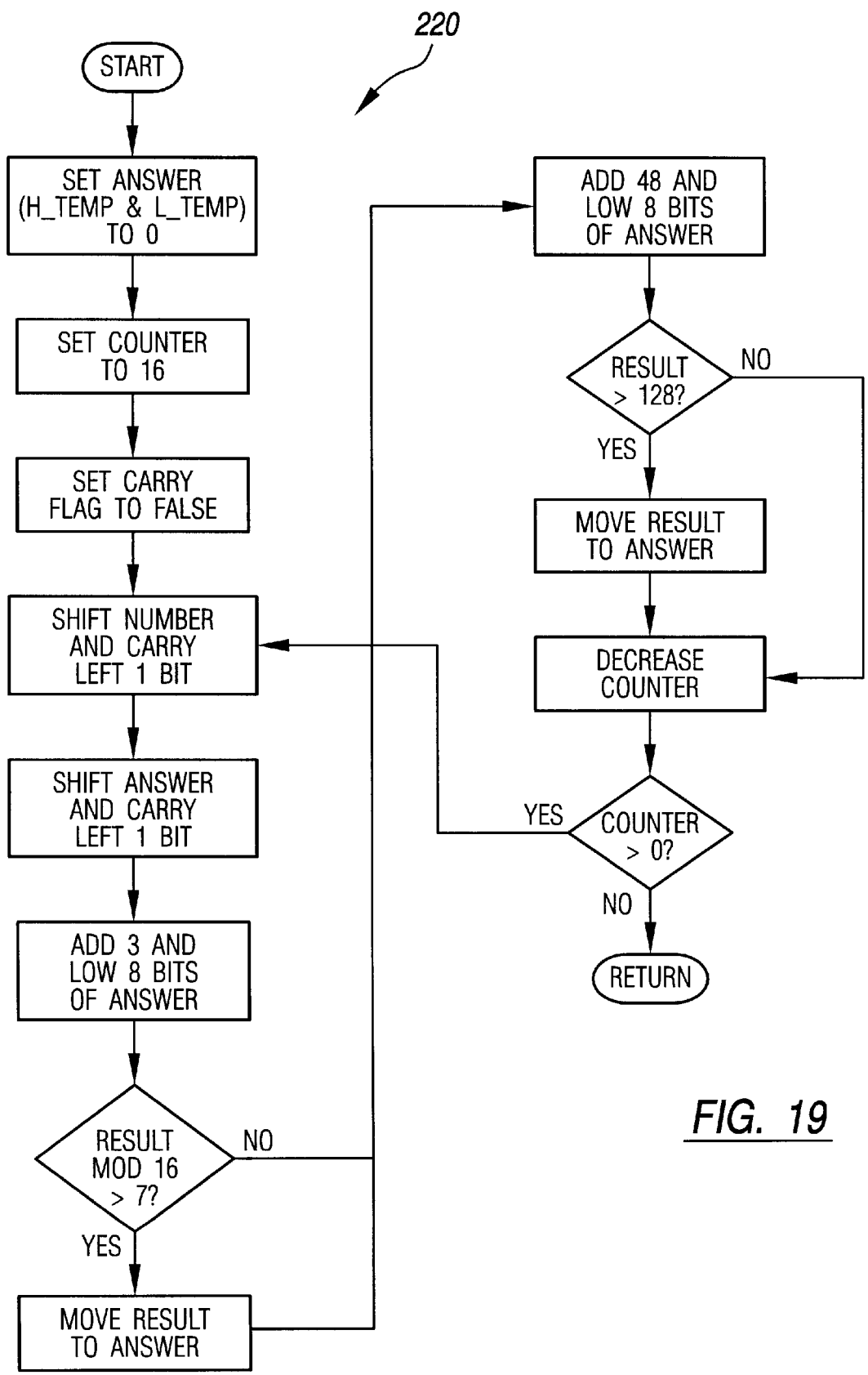
FIG. 19 is a flow chart illustrating the routine that converts binary numbers that the circuitry receives from the A/D converter circuits in Binary Coded Decimal numbers for use in the circuits of the preferred embodiment.
Figure 20:
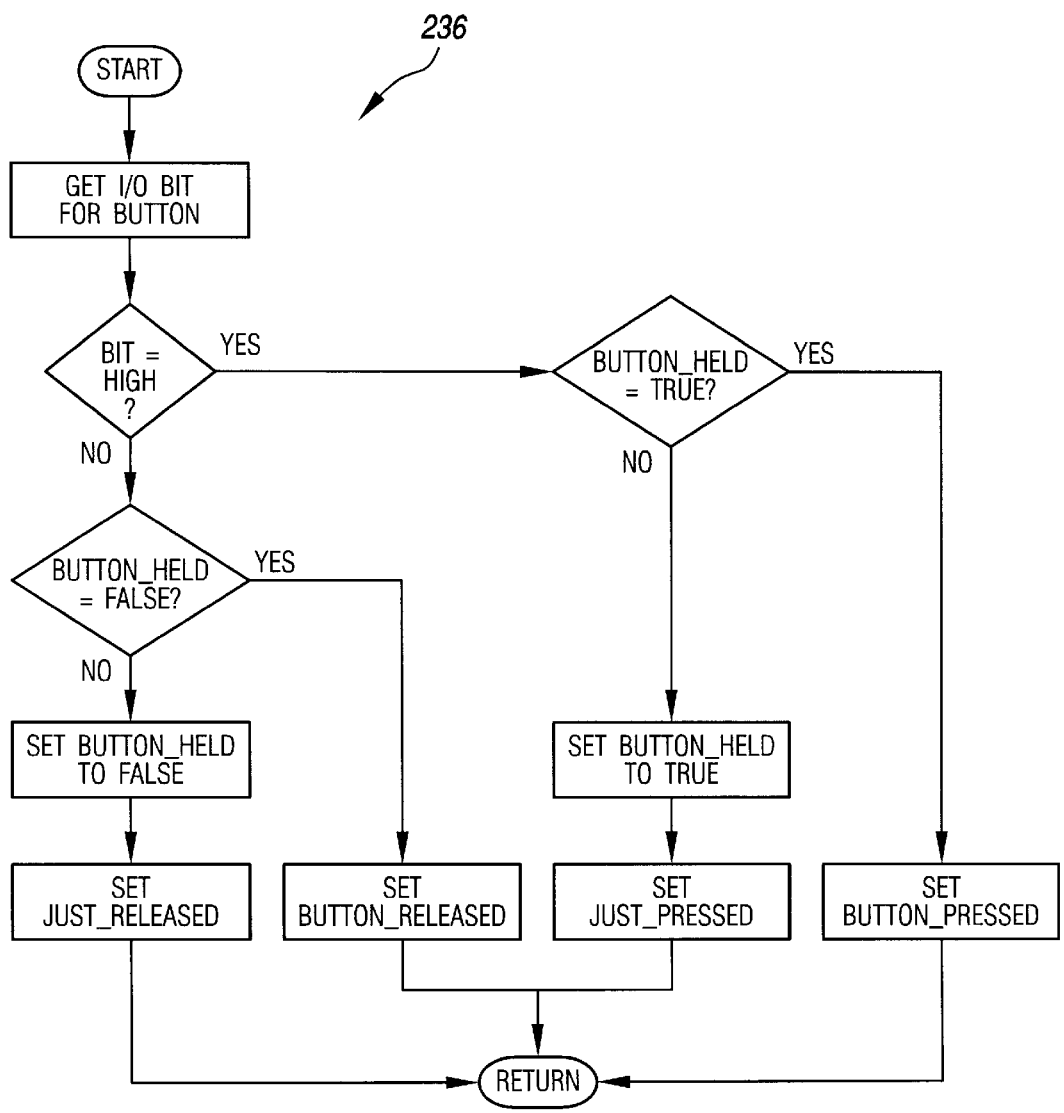
FIG. 20 is a flow chart illustrating the routine in the circuitry of the preferred embodiment to determine whether the button is depressed.

The method (routine 232) used to average readings of the sensor is shown in FIG. 16. The resulting average value is stored as the "H temp" and "L tempt." FIG. 17 shows routine 212 for converting signals to font for display. FIG. 18 sets out the routine 234 for actuating the sound producing circuitry when predetermined parameters are met during operation of the device. FIG. 19 shows routine 220 for converting binary numbers that are received from the A/D converter circuits into Binary Coded Decimals (BCD) numbers. FIG. 20 sets forth the steps (routine 236) used in the circuitry to determine whether the button is depressed or whether it has been released. FIG. 21 shows the debug routine 204 and the relationship between the steps used therein. This routine displays raw A/D numbers from the A/D circuits. The displayed numbers do not have adjustments, offsets or any other conditioning done to them.

Figure 25:
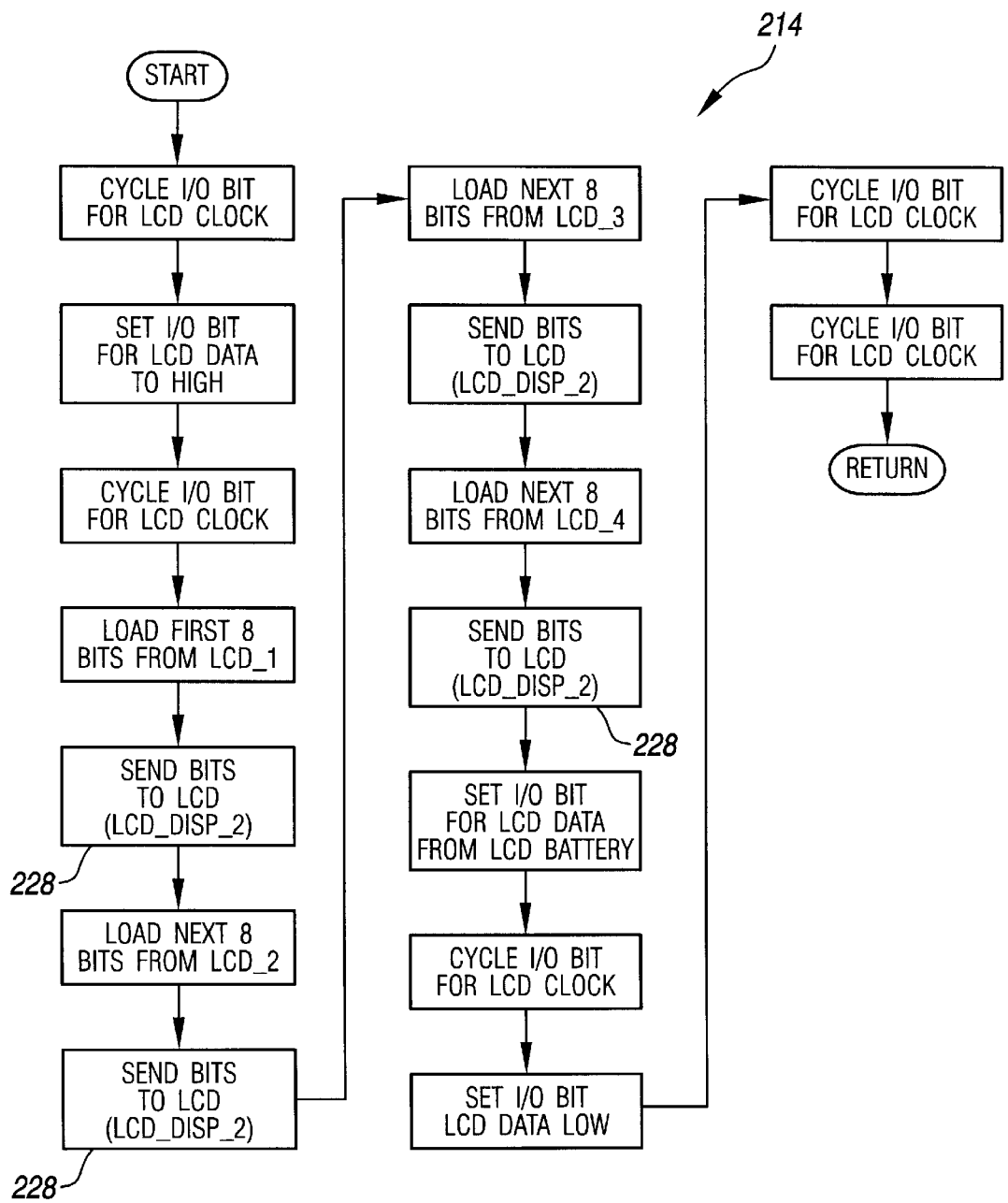
FIG. 25 is a flow chart illustrating the routine for displaying the temperature values in the LCD in the circuitry of the preferred embodiment.
Figure 26:
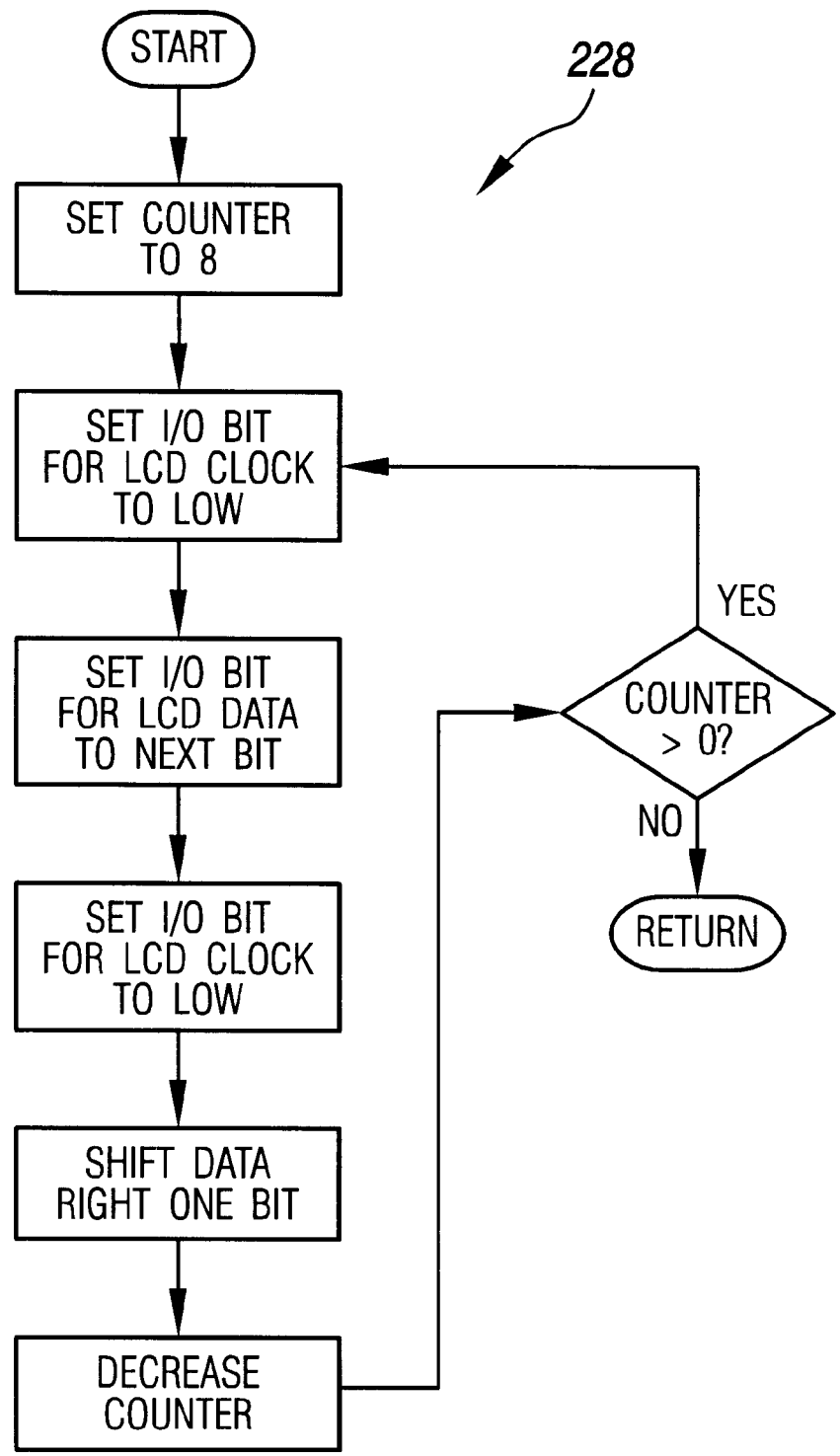
FIG. 26 is a flow chart illustrating a second routine for displaying the temperature values in the LCD in the circuitry of the preferred embodiment.
Figure 27:
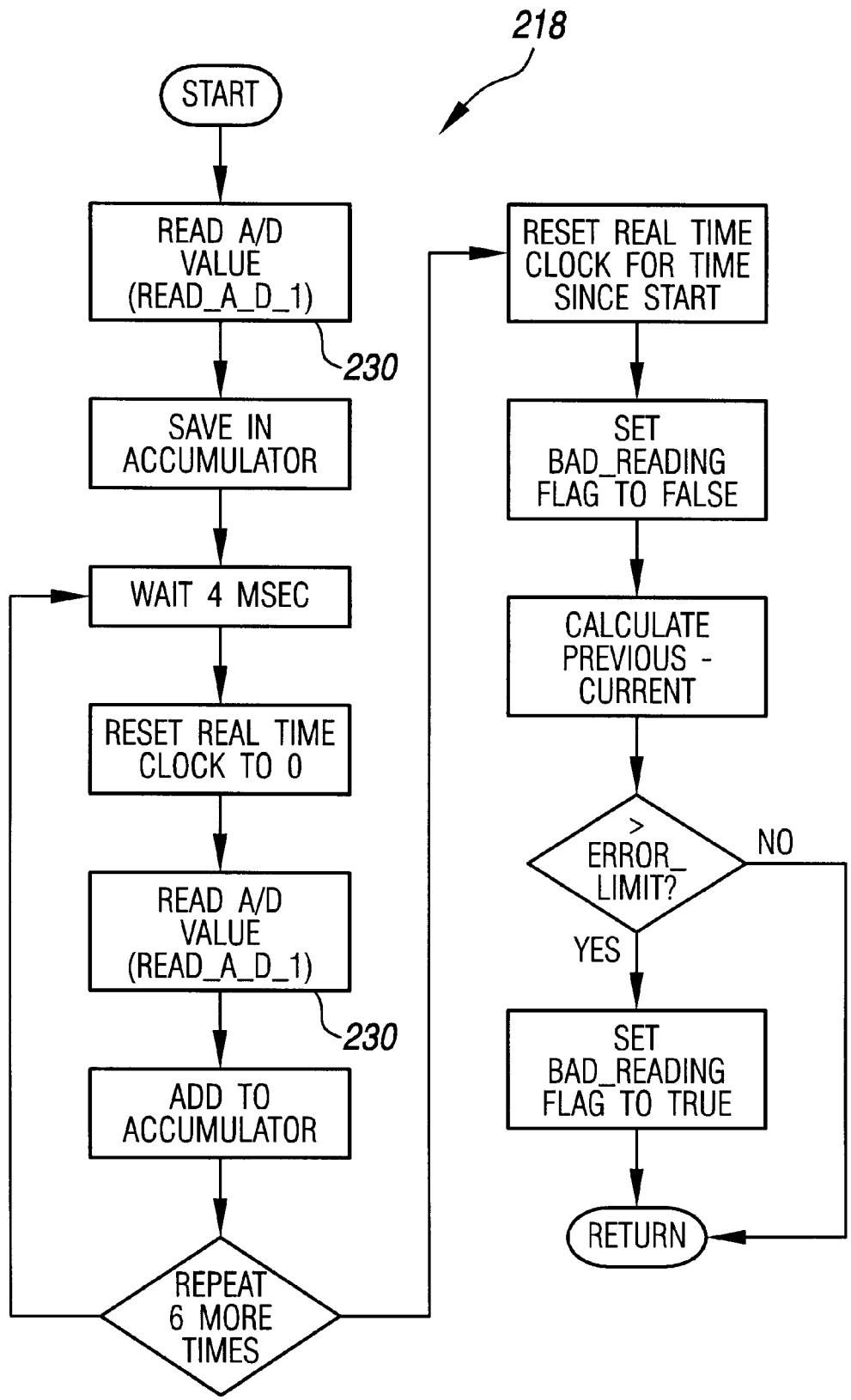
FIG. 27 is a flow chart illustrating the routine for repeatedly reading and accumulating analog to digital conversion values in the circuitry of the preferred embodiment.

The routine 212 shown to convert the values to font for display (FIG. 17) is executed just prior to the LCD display routine 214 (FIG.25). Later the 100 millisecond routine 216 (FIG. 31) and subsequent read A/D routine 218 (FIG. 27) are executed. Still later in the debug routine 204 is the conversion of binary numbers routine 220 (FIG. 19) which leads again to the conversion to font routine 212 (FIG. 17).

Figure 22:
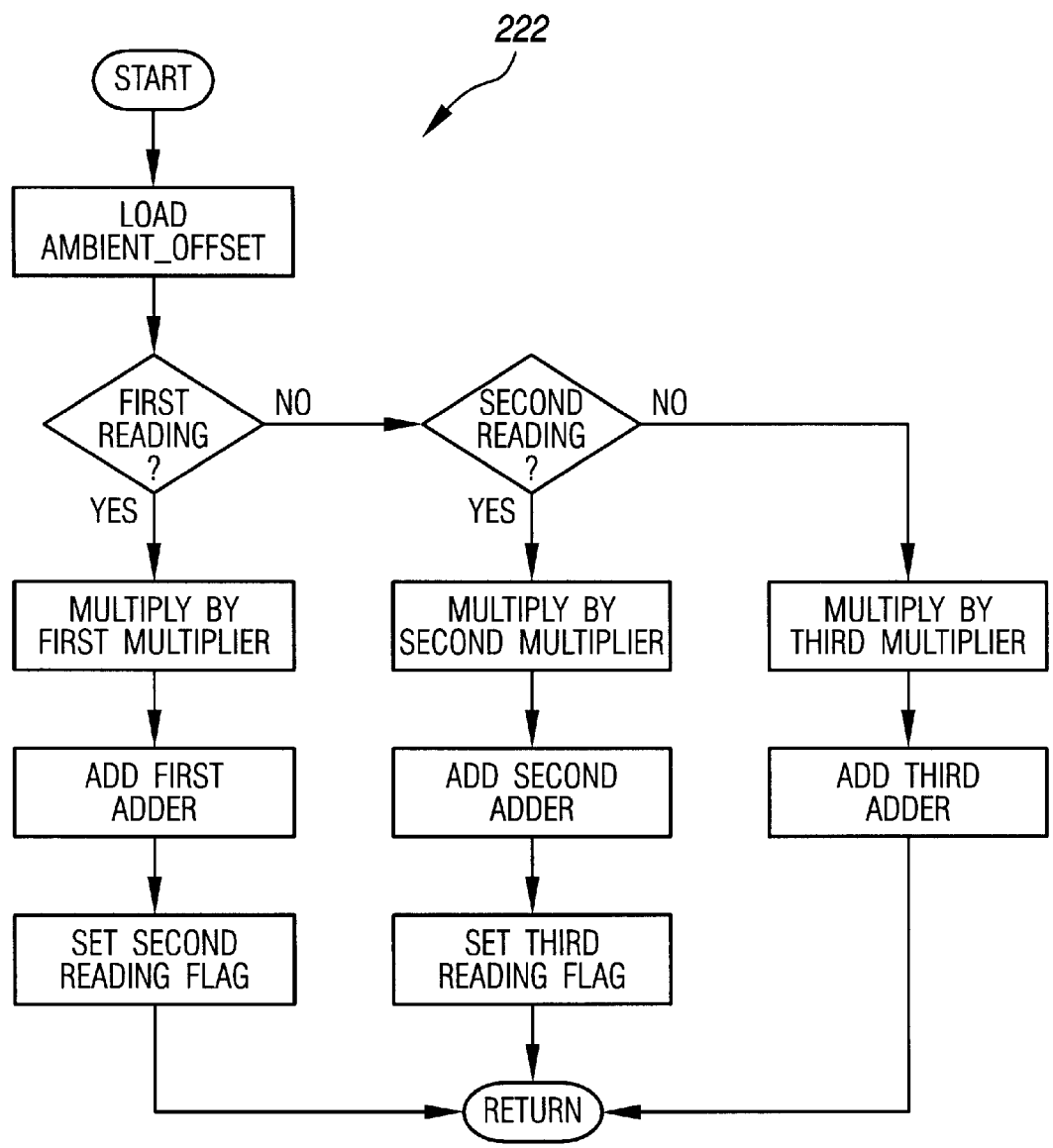
FIG. 22 is a flow chart illustrating the routine for adding a value to the resistance or temperature reading in the circuitry of the preferred embodiment.
Figure 23:
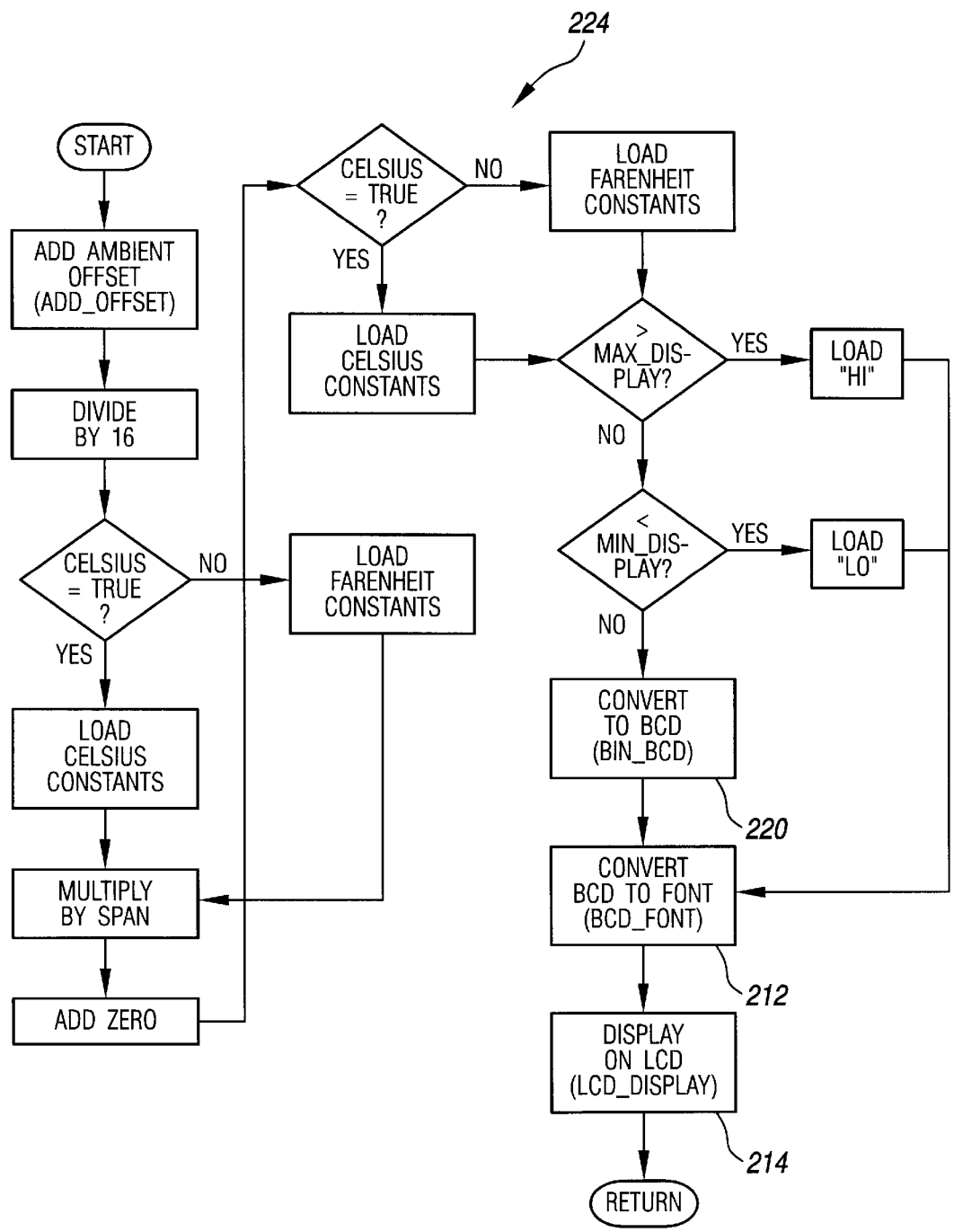
FIG. 23 is a flow chart illustrating the routine for displaying a temperature in the circuitry of the preferred embodiment.

FIG. 22 shows the steps used in the routine 222 for determining the value for an offset to be used in a routine 224 for displaying the final calculation of the core body value (FIG. 23). FIG. 24 shows the routine 202 for initialization, resetting values to a known starting point. This routine is shown as a single step in FIG. 14. This initialization routine 202 includes a routine 226 (FIG. 29) within it to read the temperature. Included within the routine 214 for actuating the LCD display (FIG. 25), is a second LCD display routine 228 shown in more detail in FIG. 26.

Figure 28:
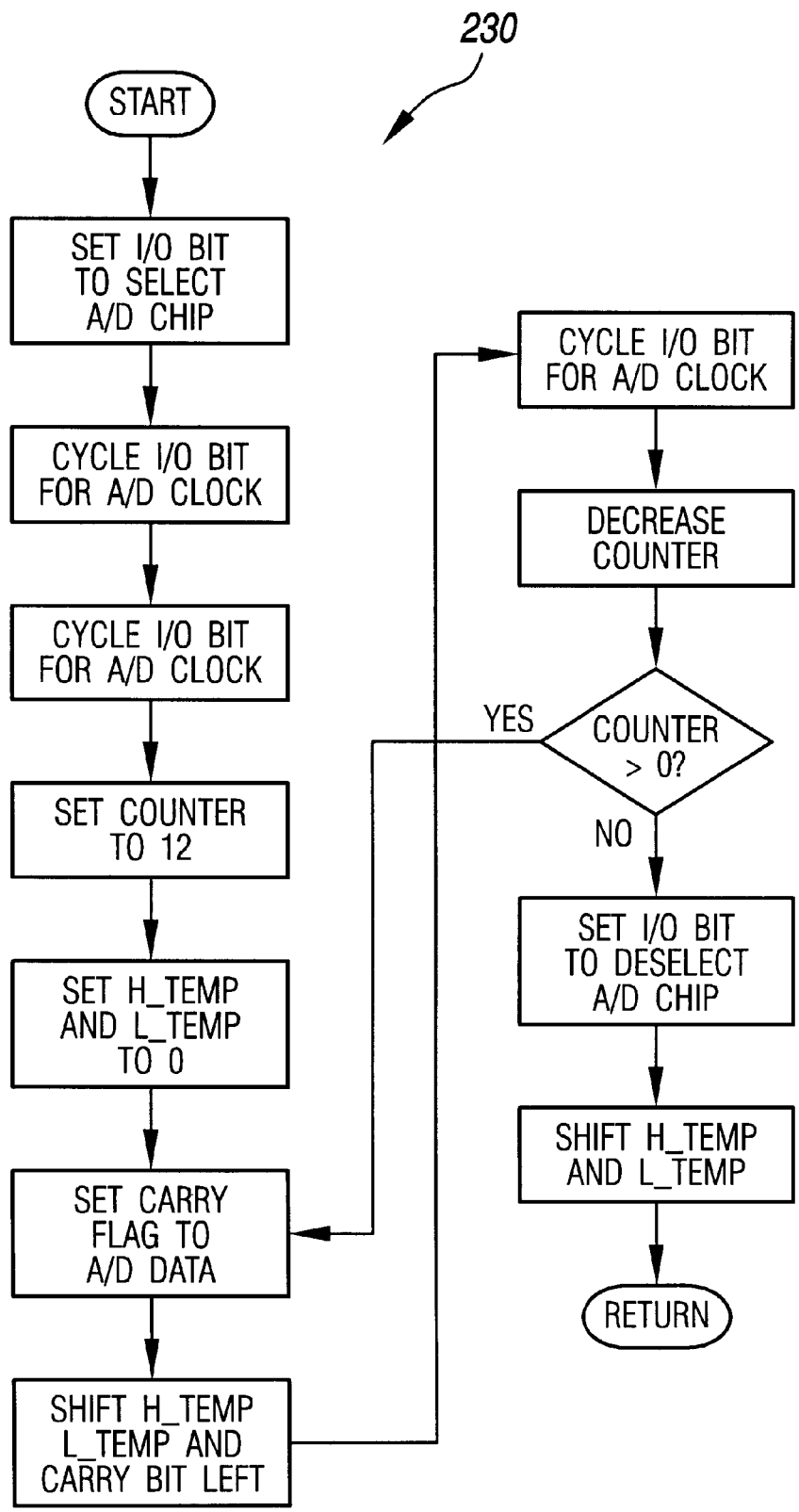
FIG. 28 is a flow chart illustrating the subroutine for reading the analog to digital value in the circuitry of the preferred embodiment.
Figure 29:
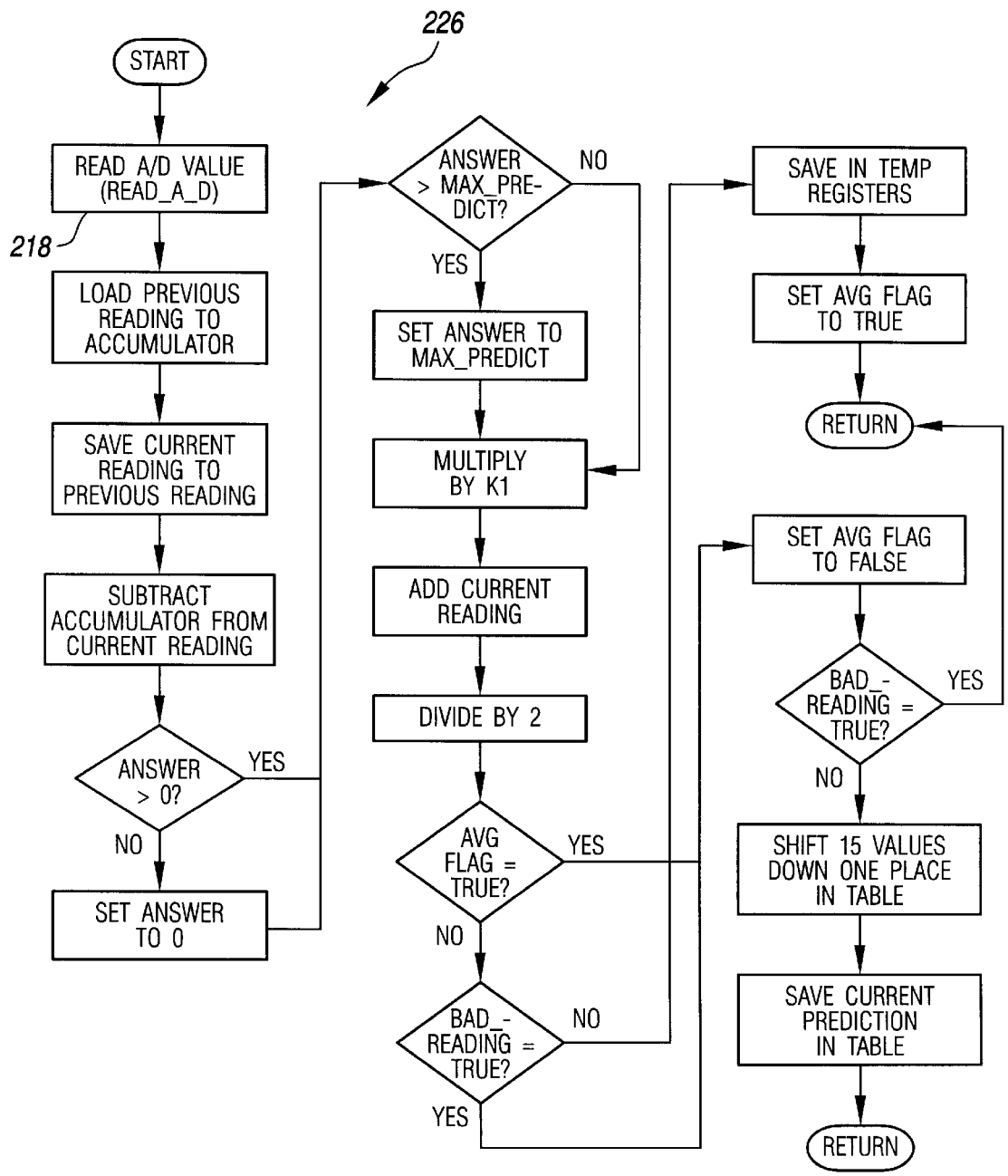
FIG. 29 is a flow chart illustrating the routine for calculating and converting the resistance values to temperature readings in the circuitry of the preferred embodiment.
Figure 31:
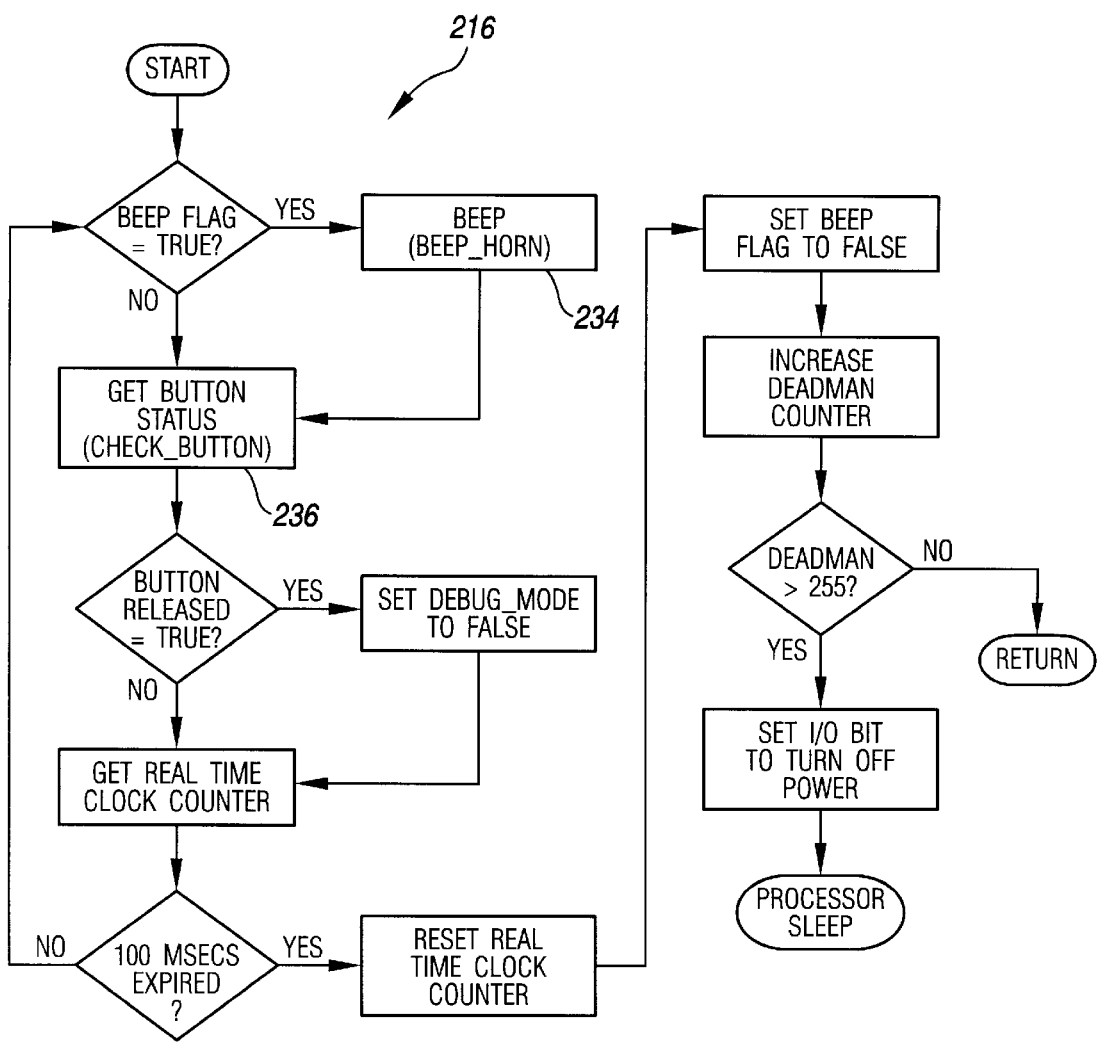

The read A/D routine 218 includes within it a second read A/D routine 230 shown in more detail in FIG. 28. FIG. 29 sets forth the routine 226 for reading the temperature. FIG. 30 shows the execution or run sequence including many other routines, such as the average readings routine 232 shown in more detail in FIG. 16. FIG. 31 shows the 100 millisecond wait routine 216. It includes the sound actuation routine 236 (FIG. 18) and the button depress/release determination routine 236 (FIG. 20).

It further has been discovered that the accuracy of the disclosed means and method of quickly registering core body temperature can be improved by taking into account the thermodynamics of the interaction of the sensor with the contact surface of the body. In the preferred embodiment, it is known that the sensor theoretically will reach 71% of its final equilibrium temperature at about eight seconds of contact. The temperature rise is logarithmic however, and will not actually approach equilibrium until after a much longer period. The modeling incorporated into the circuitry takes advantage of the linearity of the temperature rise to the 71% level to distinguish the calculated end temperatures.

A single exponential equation will model the rise in sensor temperature induced by a heat sink that exhibits overwhelming thermodynamic mass relative to a resistance sensor. Experimentation has shown that a single exponential equation when applied to the change in sensor temperature induced by a heat sink with low thermodynamic mass relative to the sensor, does not accurately model the resulting heat rise curve because the heat sink temperature falls after contact with the cooler sensor and probe material.

The extent to which the target heat sink temperature falls is a function of the relative temperatures of the starting probe and target, and the amount of time that the probe is in contact with the target. The dynamic temperature lowering of the target while the target is transferring heat to the sensor results if the sensor thermodynamic mass, including the mass of material in which the sensor is mounted, is relatively close to (or greater than) the thermodynamic mass of the target heat sink.

In the preferred embodiment of the present invention, the target temperature lowering phenomena is taken into consideration by using the following methods. First, the invention utilizes a relatively small sensor surface area. Second, the invention utilizes relatively low thermodynamic mass mounting material. Third, the invention mounts the sensor on low mass mounting material in such a manner to maximize sensor contact with the heat sink target and to minimize mounting material contact.

Fourth, the invention models the heat rise curve as a linear function of the temperature (A/D reading) at which the invention begins the temperature measuring process. Fifth, the invention models the heat rise curve as a linear function of the amount of time which the user applies the sensor to the target skin area prior to initiating a read cycle. In addition, the measurement of the amount of time between read initiation and the accumulation of the correct number of "good reads," and the use of the relationship of this time to surface temperature, would contribute to the accuracy of the displayed temperature.

The time between the probe first coming in contact with the target and the time when the read cycle is initiated is determined by observing a change in the resistance properties of the sensor. As soon as the sensor touches the target, the A/D readings immediately move rapidly upward. The end of a "pre read time" is marked by observing the depression of the read button.

The slope and intercept of the three linear equations can be resolved by regressing starting A/D, ending A/D (stated as variance from actual target temperature), time between start and read initiation values and time between read initiation and completion of the read cycle. The exact slope and intercept values are a function of the thermodynamic heat sinking properties of the sensor heat sink and probe mounting materials chosen and the mounting configuration selected. A series of experiments will determine the appropriate time constant for the exponential equation and collect a statistically significant set of starting temperatures, ending temperatures and times between start and read initiation.

The linear equation slope and intercept values are determined by collecting and statistically analyzing (regressing) starting A/D, ending A/D, time to initiate read and time between read initiation and read completion. The linear equation for each relationship may be stated as follows:

$$Y(1)=M(1)*X(1)+B(1)$$
$$Y(2)=M(2)*X(2)+B(2)$$
$$Y(3)=M(3)*X(3)+B(3)$$

Where:
Y(1,2,3)=Actual target A/D minus End A/D (1,2,3)
M(1,2,3)=X coefficient resulting from linear regression
X(1)=Starting A/D
X(2)=Time between start and read initiation
X(3)=Time between read start and read completion
B(1,2,3)=Constant resulting from linear regression By simultaneously solving these three linear equations, final slope and intercept values utilized in the invention's linear adjustment circuitry may be calculated and applied to the equation:

$$\text{Calculated End A/D=End A/D=Start A/D}*M(f)+B(f)$$

where:
M(f)=Final slope resulting from simultaneous solution
B(f)=Final constant resulting from simultaneous solution Additionally, a "calculated end" temperature also varies as a function of first read (after power up state), second and subsequent rapid read cycles. For third and subsequent reads in the same power up cycle, the variance due to these factors is relatively minor as compared to the first two. The invention detects first, second, third and subsequent to third reads by counting read button depressions in a given power up cycle and applies a different set of M(f) and B(f) values for first, second and third (and beyond) read cycles. If greater precision is desired, M(f) and B(f) values can be determined for fourth, fifth, etc. read cycles. The different M(f) and B(f) values are determined in the same manner as described above except that the starting A/D value is defined as (1) at power up, (2) at 1st read button depression (3) at 2nd read button depression (3) at 2nd read button depression (3) at 3rd and subsequent read button depression.

The invention has been described in connection with a preferred embodiment, but the invention is greater than and not intended to be limited to the particular form set forth. The invention is intended to cover such alternatives, modifications, and equivalents as may be included within the spirit and scope of the invention as defined by the appended claims.

What is claimed is:

1. A quick registering thermometer for displaying the core body temperature of a mammal, the thermometer comprising:

a housing having a probe adapted to contact the skin of the mammal, the probe at least partially comprised of a heat insulating material;

temperature responsive means having electrical resistance varying with temperature, the temperature responsive means mounted on the periphery of the heat insulated portion of the probe to contact the skin when the probe is applied thereto, wherein the temperature responsive means contact the skin's surface in the concha when the probe is inserted into the ear;

means for detecting the changes in the resistance of the temperature responsive means;

means for converting the detected changes in resistance of the temperature responsive means to signals representative of core body temperature;

means for displaying the core body temperature;

wherein the means for detecting the changes in the resistance of the temperature responsive means comprises:

a reference resistor coupled to one end of said temperature responsive means to form a series electrical circuit;

a constant current source coupled to said series electrical circuit for providing a constant current thereto;

a first amplifier coupled to said series circuit at said one end of said temperature responsive means between said responsive means and said reference resistor for providing an output that is the amplified analog voltage drop across said reference resistor;

a second amplifier coupled to said series electrical circuit at the other end of said responsive means for providing an output that is the amplified analog voltage drop across said series circuit; and an analog-to-digital converter having first and second input terminals respectively coupled to said first and second amplifier outputs for converting the difference in said amplifier analog voltages to a digital signal;

wherein said series electrical circuit further comprises a microprocessor; and, wherein said microprocessor calculates the temperature at which the temperature responsive means would move to thermal equilibrium, $T_f$, wherein $$T_f = Tn-1-Tn\ 1-e^{-1k}+Tn$$

wherein

Tn−1=the temperature at time, N+1,

Tn=the temperature at time, N,

T=the time since the last measurement and is a constant; and k=the coefficient of heat transfer determined experimentally.

2. A thermometer as in claim 1 wherein said constant current is in the range of 0.1 mA to 2.0 mA.

3. A thermometer as in claim 1 wherein:

said reference resistor has the resistance characteristics equal to that of the responsive means when the temperature responsive means is at a minimum predetermined temperature to be measured by said thermometer; and said first amplifier amplifies said voltage across said reference resistor by a factor sufficient to produce a voltage equal to that found across the responsive means at said minimum predetermined temperature.

4. A thermometer as in claim 1 wherein:

said analog-to-digital converter provides bits of resolution sufficient to fulfill the requirements of the microprocessor.

5. A thermometer as in claim 4 wherein said series electrical circuit further comprises a microprocessor and a serial bit interface.

6. A quick registering thermometer comprising:

a housing having a probe, the probe at least partially comprised of a heat insulating material;

temperature responsive means having electrical resistance properties that vary with temperature, the responsive means mounted on the periphery of the heat insulated portion of the probe;

means communicating with the temperature responsive means for detecting the changes in the resistance of the responsive means;

means communicating with the detecting means for converting the detected changes in resistance of the temperature responsive means to electrical signals representing a calculated temperature;

means communicating with the converting means for displaying the calculated temperature;

wherein the means for detecting the changes in the resistance of the temperature responsive means comprises a reference resistor coupled to one end of said temperature responsive means to form a series electrical circuit, a constant current source coupled to said series electrical circuit for providing a constant current thereto, a first amplifier coupled to said series circuit at said one end of said temperature responsive means between said responsive means and said reference resistor for providing an output that is the amplified analog voltage drop across said reference resistor, a second amplifier coupled to said series electrical circuit at the other end of said responsive means for providing an output that is the amplified analog voltage drop across said series circuit, and an analog-to-digital converter having first and second input terminals respectively coupled to said first and second amplifier outputs for converting the difference in said amplifier analog voltages to a digital signal;

a noise filter including a capacitor coupled from each end of the responsive means to ground for high frequency noise filtering; and a paralleled set of capacitors coupled across said responsive means for providing high frequency and low frequency noise filtering.

7. A thermometer as in claim 6 wherein:

said high frequency filter capacitors are 0.1 mF ceramic capacitors; and said low frequency filter capacitor is a 10 mF tantalum capacitor.

8. A thermometer as in claim 7 further including:

a high frequency ceramic capacitor coupled from each of said first and second input terminals of said analog-to-digital converter to ground;

a resistor in series with each of said first and second terminals of said analog-to-digital converter such that, in combination with said high frequency ceramic capacitors coupled to said first and second terminals of said analog-to-digital convertor, a first order low pass filter is provided on the input of each of said first and second terminals;

a power bus providing power to said first and second circuits; and, a voltage reference input terminal to said analog-to-digital converter.

9. A quick registering thermometer comprising:

a housing having a probe, the probe at least partially comprised of a heat insulating material;

temperature responsive means having electrical resistance properties that change with temperature, the responsive means mounted on the periphery of the heat insulated portion of the probe;

a reference resistor coupled to one end of said temperature responsive means to form a series electrical circuit;

a constant current source coupled to said series electrical circuit for providing a constant current thereto;

a first amplifier coupled to said series circuit at said one end of said temperature responsive means between said responsive means and said reference resistor for providing an output that is the amplified analog voltage drop across said reference resistor;

a second amplifier coupled to said series electrical circuit at the other end of said responsive means for providing an output that is the amplified analog voltage drop across said series circuit; and an analog-to-digital converter having first and second input terminals, the converter converting said amplifier analog voltages to a digital signal;

means communicating with the temperature responsive means for converting changes in resistance of the temperature responsive means to electrical signals representing a calculated temperature; and, means communicating with the converting means for displaying the calculated temperature;

wherein a microprocessor samples said digital signal from the analog-to-digital converter representing the instantaneous voltage across said temperature responsive means at four equally spaced time intervals during one cycle; and said microprocessor averages said four samples to substantially cancel 60-cycle noise.

10. A thermometer as in claim 9 wherein said time intervals are 250 ms.

11. A thermometer as in claim 9 wherein said microprocessor calculates the temperature at which the sensor would move to thermal equilibrium, $T_f$, wherein $$T_f = Tn-1-Tn\ 1-e^{-1k}+Tn$$

wherein

Tn−1=the temperature at time, N+1,

Tn=the temperature at time, N,

T=the time since the last measurement and is a constant; and k=the coefficient of heat transfer determined experimentally.

12. A thermometer as in claim 11 wherein:

said microprocessor has first and second data storage registers; and said microprocessor averages the digital signal samples in groups that are factors of two to allow each sample to be shifted in said first register.

13. The thermometer of claim 9, further comprising error adjustment means to adjust upward the displayed temperature an amount determined from an initial resistance of the temperature responsive means.

14. The thermometer of claim 9 further comprising error adjustment means to adjust the displayed temperature an amount determined from the number of readings the temperature had been displayed in a preceding period of time.

15. A quick registering thermometer comprising:

a housing having a probe, the probe at least partially comprised of a heat insulating material;

temperature responsive means having electrical resistance properties that vary with temperature, the responsive means mounted on the periphery of the heat insulated portion of the probe;

a reference resistor coupled to one end of said temperature responsive means to form a series electrical circuit;

a constant current source coupled to said series electrical circuit for providing a constant current thereto;

a first amplifier coupled to said series circuit at said one end of said temperature responsive means between said responsive means and said reference resistor for providing an output that is the amplified analog voltage drop across said reference resistor;

a second amplifier coupled to said series electrical circuit at the other end of said responsive means for providing an output that is the amplified analog voltage drop across said series circuit;

an analog-to-digital converter having first and second input terminals respectively coupled to said first and second amplifier outputs for converting the difference in said amplifier analog voltages to a digital signal;

means communicating with the detecting means for converting the detected changes in resistance of the temperature responsive means to electrical signals representing a calculated temperature; and, means communicating with the converting means for displaying the calculated temperature.

16. A thermometer as in claim 15 wherein said constant current is in the range of 0.1 mA to 2.0 mA.

17. A thermometer as in claim 15 wherein:

said reference resistor has the resistance characteristics equal to that of the responsive means when the temperature responsive means is at a minimum predetermined temperature to be measured by said thermometer; and said first amplifier amplifies said voltage across said reference resistor by a factor sufficient to produce a voltage equal to that found across the responsive means at said minimum predetermined temperature.

* * * * *